United States Patent
Alonso-Mora et al.

(10) Patent No.: US 11,614,751 B2
(45) Date of Patent: *Mar. 28, 2023

(54) SYSTEM FOR ON-DEMAND HIGH-CAPACITY RIDE-SHARING VIA DYNAMIC TRIP-VEHICLE ASSIGNMENT AND RELATED TECHNIQUES

(71) Applicant: Massachusetts Institute of Technology, Cambridge, MA (US)

(72) Inventors: Javier Alonso-Mora, Leiden (NL); Samitha Samaranayake, Brooktondale, NY (US); Alexander J. Wallar, Cambridge, MA (US); Daniela L. Rus, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 169 days.

This patent is subject to a terminal disclaimer.

(21) Appl. No.: 15/877,935

(22) Filed: Jan. 23, 2018

(65) Prior Publication Data

US 2018/0231984 A1     Aug. 16, 2018

Related U.S. Application Data

(60) Provisional application No. 62/449,315, filed on Jan. 23, 2017.

(51) Int. Cl.
| | |
|---|---|
| *G05D 1/02* | (2020.01) |
| *G06Q 10/06* | (2012.01) |
| *G05D 1/00* | (2006.01) |
| *G06Q 10/0631* | (2023.01) |

(52) U.S. Cl.
CPC ......... *G05D 1/0291* (2013.01); *G05D 1/0088* (2013.01); *G06Q 10/0631* (2013.01); *G05D 2201/0213* (2013.01)

(58) Field of Classification Search
CPC ................. G06N 5/04; G06Q 10/0631; G06Q 10/06311; G08G 1/202; G05D 1/0291; G05D 1/0088; G05D 2201/0213
USPC ..................................................... 701/26, 23
See application file for complete search history.

(56) References Cited

U.S. PATENT DOCUMENTS

| | | |
|---|---|---|
| 6,317,720 B1 | 11/2001 | Murakami et al. |
| 6,697,730 B2 | 2/2004 | Dickerson |
| 6,701,300 B1 | 3/2004 | Murakami et al. |
| 7,363,126 B1 * | 4/2008 | Zhong ................ G01C 21/3484 340/992 |

(Continued)

OTHER PUBLICATIONS

Stenger, et al.; "An Adaptive Variable Neighborhood Search Algorithm for a Vehicle Routing Problem Arising in Small Package Shipping;" Transportation Science; Institute for Operations Research and the Management Sciences (INFORMS); Jun. 28, 2018; 18 pages.

(Continued)

*Primary Examiner* — Fadey S. Jabr
*Assistant Examiner* — Mohamed Abdo Algehaim
(74) *Attorney, Agent, or Firm* — Daly, Crowley, Mofford & Durkee, LLP

(57) ABSTRACT

Described are concepts, systems, devices and techniques for real-time high-capacity ride-sharing that (i) scales to large numbers of passengers and trips and (ii) dynamically generates routes (e.g. optimal or near optimal routes) in response to online demand and vehicle locations.

10 Claims, 12 Drawing Sheets

(56) References Cited

U.S. PATENT DOCUMENTS

| | | | | |
|---|---|---|---|---|
| 8,554,608 | B1* | 10/2013 | O'Connor | G08G 1/0962 705/1.1 |
| 9,562,785 | B1* | 2/2017 | Racah | G01C 21/3438 |
| 9,754,490 | B2* | 9/2017 | Kentley | G06Q 50/30 |
| 9,984,574 | B2* | 5/2018 | Laetz | G08G 1/202 |
| 10,024,673 | B1* | 7/2018 | Zhang | G06Q 50/30 |
| 10,169,804 | B2* | 1/2019 | Thangaraj | G06Q 30/0631 |
| 2002/0019760 | A1 | 2/2002 | Murakami et al. | |
| 2012/0130627 | A1* | 5/2012 | Islam | G06Q 10/08 701/300 |
| 2012/0239452 | A1* | 9/2012 | Trivedi | G06Q 10/00 705/7.22 |
| 2013/0024249 | A1* | 1/2013 | Zohar | G07B 15/02 705/13 |
| 2015/0081360 | A1* | 3/2015 | Sun | G06Q 50/28 705/7.13 |
| 2015/0161554 | A1* | 6/2015 | Sweeney | G06Q 10/08355 705/7.15 |
| 2015/0161564 | A1* | 6/2015 | Sweeney | G06Q 10/063114 705/338 |
| 2015/0206437 | A1* | 7/2015 | Fowler | G08G 1/202 701/410 |
| 2015/0278712 | A1* | 10/2015 | Fujita | G06Q 10/02 705/5 |
| 2015/0339928 | A1* | 11/2015 | Ramanujam | G08G 1/202 701/23 |
| 2015/0345951 | A1* | 12/2015 | Dutta | G01C 21/3605 701/400 |
| 2015/0356483 | A1* | 12/2015 | Saliba | G06Q 10/06314 705/7.24 |
| 2016/0027307 | A1* | 1/2016 | Abhyanker | G08G 1/005 701/117 |
| 2016/0033971 | A1* | 2/2016 | Thomson | G05D 1/0212 701/26 |
| 2016/0011761 | A1 | 4/2016 | Ikeda et al. | |
| 2016/0117610 | A1* | 4/2016 | Ikeda | G06Q 10/02 705/5 |
| 2016/0187151 | A1* | 6/2016 | Barbieri | G01C 21/3446 701/540 |
| 2016/0209220 | A1* | 7/2016 | Laetz | G08G 1/202 |
| 2016/0300318 | A1 | 10/2016 | Godil | |
| 2016/0307287 | A1* | 10/2016 | Jat | G06Q 30/0631 |
| 2017/0091891 | A1* | 3/2017 | Van Der Berg | G07B 15/02 |
| 2017/0098377 | A1* | 4/2017 | Marco | G01C 21/34 |
| 2017/0256168 | A1* | 9/2017 | Lambert | G06Q 10/06315 |
| 2017/0365030 | A1* | 12/2017 | Shoham | G07B 15/02 |
| 2018/0033058 | A1* | 2/2018 | Mukherjee | G06Q 30/0282 |
| 2018/0060988 | A1* | 3/2018 | Klenk | G06Q 50/30 |
| 2018/0108103 | A1* | 4/2018 | Li | G06Q 20/322 |
| 2018/0150085 | A1* | 5/2018 | Dey | B25J 9/161 |
| 2018/0188731 | A1* | 7/2018 | Matthiesen | G06Q 10/02 |
| 2018/0202822 | A1* | 7/2018 | DeLizio | G01C 21/3407 |
| 2018/0209803 | A1* | 7/2018 | Rakah | G01C 21/3492 |
| 2018/0209804 | A1* | 7/2018 | Rakah | G06Q 10/047 |
| 2018/0209805 | A1* | 7/2018 | Rakah | B60N 2/002 |
| 2018/0209806 | A1* | 7/2018 | Rakah | G06Q 10/02 |
| 2018/0211124 | A1* | 7/2018 | Rakah | G06Q 50/30 |
| 2018/0211185 | A1* | 7/2018 | Rakah | G08G 1/0125 |
| 2018/0211186 | A1* | 7/2018 | Rakah | G01C 21/3415 |
| 2018/0211541 | A1* | 7/2018 | Rakah | G08G 1/0129 |
| 2018/0238698 | A1* | 8/2018 | Pedersen | B60L 58/16 |
| 2018/0341887 | A1* | 11/2018 | Kislovskiy | G08G 1/202 |
| 2018/0349825 | A1* | 12/2018 | Yamamoto | G06Q 10/06314 |
| 2018/0356239 | A1* | 12/2018 | Marco | G06Q 10/04 |
| 2018/0366004 | A1* | 12/2018 | Laetz | G08G 1/202 |
| 2019/0066250 | A1* | 2/2019 | Levy | G01C 21/3438 |
| 2019/0251496 | A1 | 8/2019 | DaCosta et al. | |
| 2019/0304043 | A1* | 10/2019 | Nakamura | G07C 1/10 |
| 2020/0211070 | A1* | 7/2020 | Singh | G06Q 30/0284 |
| 2022/0027800 | A1* | 1/2022 | Ramot | H04W 4/023 |
| 2022/0351104 | A1* | 11/2022 | Lodhia | G06Q 10/0631 |

OTHER PUBLICATIONS

U.S. Appl. No. 15/941,449, filed Mar. 30, 2018, Alonso-Mora, et al.

Agatz, et al.; "Dynamic Ride-Sharing: A Simulation Study in Metro Atlanta;" ScienceDirect; Procedia Social and Behavior Sciences 17 (2011) 532-550; 19th International Symposium on Transportation and Traffic Theory; Jan. 2011; 19 pages.

Berbeglia, et al.; "Dynamic Pickup and Delivery Problems;" European Journal of Operational Research 202 (2010) 8-15; Jan. 2009; 8 pages.

Carrion, et al.; "Value of Travel Time Reliability: A Review of Current Evidence;" Transportation Research Part A 46 (2012) 720-741; Jan. 2012; 22 pages.

Castro, et al.; Urban Traffic Modelling and Prediction Using Large Scale Taxi GPS Traces; Proceedings of the 10th International Conference on Pervasive Computing; pp. 57-72; Jun. 2012; 17 pages.

Cordeau; "A Branch-and-Cut Algorithm for the Dial-a-Ride Problem;" Oper Res 54(3); Oct. 28, 2003; 25 pages.

Correia, et al.; "Solving the User Optimum Privately Owned Automated Vehicles Assignment Problem (UO-POAVAP): A Model to Explore the Impacts of Self-Driving Vehicles on Urban Mobility;" Transportation Research Part B 87 (2016) 64-88; Mar. 2016; 25 pages.

Delling, et al.; "Engineering Route Planning Algorithms;" Algorithmics of Large and Complex Networks; pp. 117-139; Jan. 2009; 23 pages.

Donovan, et al.; "Using Course GPS Data to Quantify City-Scale Transportation System Resilience to Extreme Events;" arXiv:1507.06011v1 [psysics.soc-ph]; Jul. 21, 2015; 16 pages.

Gonzales, et al.; "Modeling Taxi Demand with GPS Data from Taxis and Transit;" Mineta National Transit Research Consortium; College of Business; Report 12-16; Jul. 2014; 84 pages.

Helsgaun; "An Effective Implementation of the Lin-Kernighan Traveling Salesman Heuristic;" European Journal of Operational Research; vol. 126; Issue 1; Oct. 2000; 71 pages.

Hennessy, et al.; "Traffic Congestion, Driver Stress, and Driver Aggression;" Aggressive Behavior; vol. 25; pp. 409-423; Oct. 27, 1999; 16 pages.

Horn; "Fleet Scheduling and Dispatching for Demand-Responsive Passenger Services;" Transportation Research Part C 10 (2002) 35-63; Jan. 2002; 29 pages.

Ma, et al.; "T-Share: A Large-Scale Dynamic Taxi Ridesharing Service;" 2013 IEEE 29th International Conference on Data Engineering (CDE) pp. 410-421; Apr. 2013; 12 pages.

Moreira-Matias, et al.; "On Predicting the Taxi-Passenger Demand: A Real-Time Approach;" RPIA 2013; International Progress in Artificial Intelligence; pp. 54-65; Sep. 2013; 12 pages.

Pant, et al.; "Estimation of the Contribution of Read Traffic Emissions to Particulate Matter Concentrations from Field Measurements;" University of Birmingham; Atmospheric Environment; vol. 77; Apr. 2013; 70 pages.

Pavone, et al.; "Robotic Load Balancing for Mobility-on-Demand Systems;" International Journal of Robotics Research; Jan. 6, 2013, 26 pages.

Pillac, et al.; "A Review of Dynamic Vehicle Routing Problems;" European Journal of Operational Research; CIRRELT; Oct. 2011; 29 pages.

Santi, et al.; "Quantifying the Benefits of Vehicle Pooling with Shareability Networks;" Proceedings of National Academy of Sciences; vol. 111; No. 37; Sep. 16, 2014; 5 pages.

Shrank, et al.; TTI's 2012 Urban Mobility Report; Texas A&M Transportation Institute; Dec. 2012; 68 pages.

Spieser, et al.; "Shared-Vehicle Mobility-on-Demand Systems: A Fleet Operator's Guide to Rebalancing Empty Vehicles;" Transportation Research Board 95th Annual Meeting; Oct. 24, 2015; 15 pages.

Spieser, et al.; "Toward a Systematic Approach to the Design and Evaluation of Automated Mobility-on-Demand Systems: A Case Study in Singapore;" Road Vehicle Automation (Springer International Publishing); pp. 229-245; Jan. 2014; 17 pages.

Zhang, et al.; "Control of Robotic Mobility-on-Demand Systems: a Queueing-Theoretical Perspective;" Proceedings of Robotics: Science and Systems Conference; Apr. 2014; 10 pages.

Response to U.S. Non-Final Office Action dated Aug. 9, 2019 for U.S. Appl. No. 15/941,449; Response filed on Oct. 31, 2019; 22 Pages.

(56) References Cited

OTHER PUBLICATIONS

U.S. Non-Final Office Action dated Aug. 9, 2019 for U.S. Appl. No. 15/941,449; 54 Pages.
NYC Open Data, "2014 Yellow Taxi Trip Data;" Retrieved from https://data.cityofnewyork.us/view/gn7m-em8n on Aug. 13, 2019; 2 Pages.
Final Office Action dated Jan. 2, 2020 for U.S. Appl. No. 15/941,449; 58 Pages.
Response to Final Office Action dated Jan. 2, 2020 for U.S. Appl. No. 15/941,449; Response filed on Apr. 1, 2020; 10 Pages.
U.S. Non-Final Office Action dated Sep. 4, 2020 for U.S. Appl. No. 15/941,449; 76 Pages.

* cited by examiner

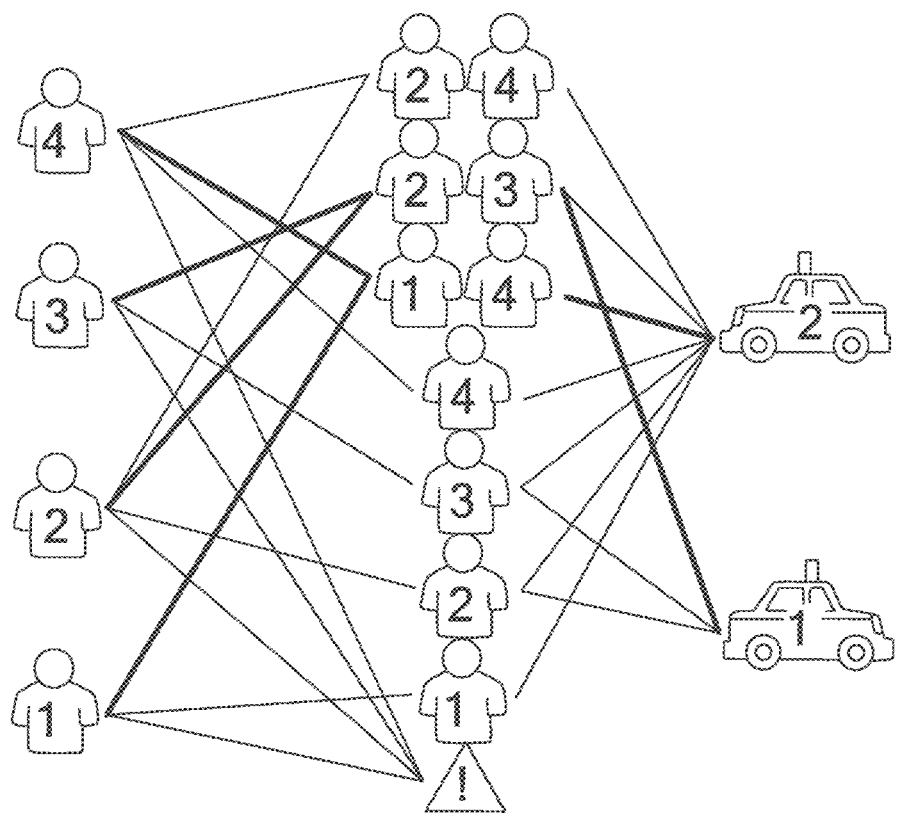
*Fig. 1*E

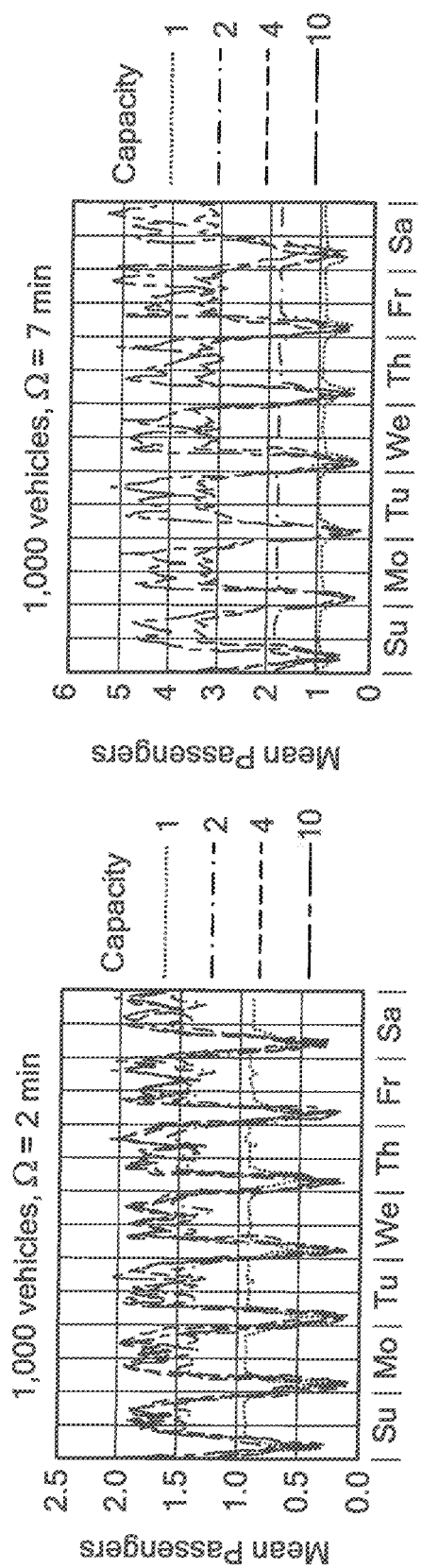
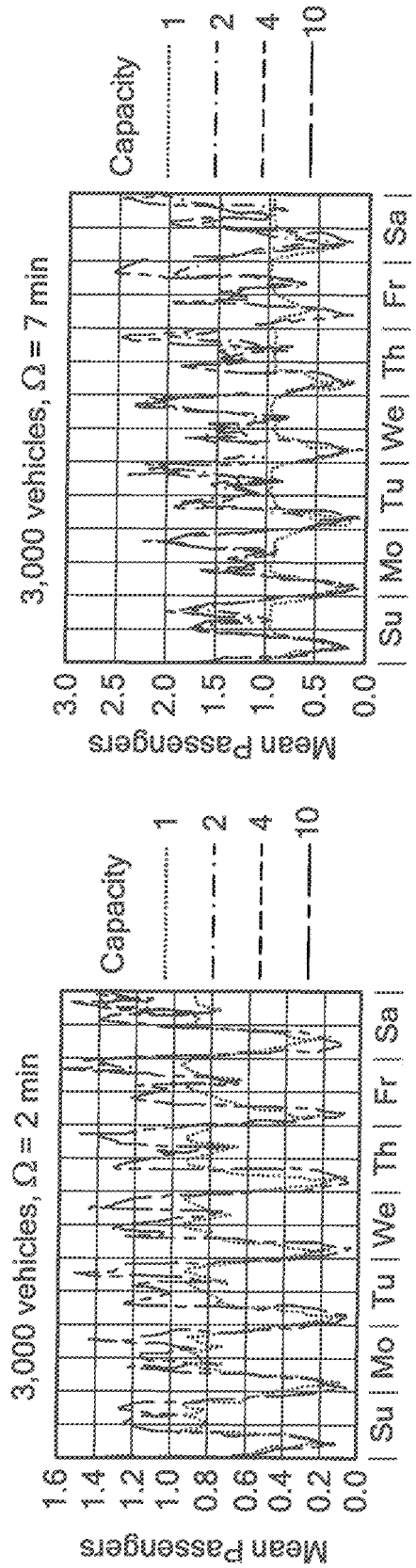
Fig. 4A
Fig. 4B
Fig. 4C
Fig. 4D

SYSTEM FOR ON-DEMAND HIGH-CAPACITY RIDE-SHARING VIA DYNAMIC TRIP-VEHICLE ASSIGNMENT AND RELATED TECHNIQUES

CROSS REFERENCE TO RELATED APPLICATIONS

This application claims the benefit of U.S. Provisional Application No. 62/449,315 filed Jan. 23, 2017 which is incorporated by reference herein in its entirety.

GOVERNMENT RIGHTS

This invention was made with Government support under Grant N00014-12-1-1000 awarded by the Office of Naval Research. The Government has certain rights in the invention.

BACKGROUND

As is known in the art, ride-sharing services are transforming urban mobility by providing timely and convenient transportation to anybody, anywhere, and anytime. These services present enormous potential for positive societal impacts with respect to pollution, energy consumption, congestion, etc. Current systems and models, however, do not fully address the potential of ride-sharing.

Ride-sharing services can provide not only a very personalized mobility experience but also ensure efficiency and sustainability via large-scale ride pooling. Large-scale ride-sharing requires mathematical models and algorithms that can match large groups of riders to a fleet of shared vehicles in real time, a task not fully addressed by current solutions.

New user-centric services are transforming urban mobility by providing timely and convenient transportation to anybody, anywhere, and anytime. These services have the potential for a tremendous positive impact on personal mobility, pollution, congestion, energy consumption, and thereby quality of life. The cost of congestion in the United States alone is roughly $121 billion per year or 1% of GDP (1), which includes 5.5 billion hours of time lost to sitting in traffic and an extra 2.9 billion gallons of fuel burned. These estimates do not even consider the cost of other potential negative externalities such as the vehicular emissions (greenhouse gas emissions and particulate matter) (2), travel-time uncertainty (3), and a higher propensity for accidents (4). Recently, the large-scale adoption of smart phones and the decrease in cellular communication costs has led to the emergence of a new mode of urban mobility, namely mobility-on-demand (MoD) systems, led by companies such as Uber, Lyft, and Via. These systems can provide users with a reliable mode of transportation that is catered to the individual and improves access to mobility to those who are unable to operate a personal vehicle, reducing the waiting times and stress associated with travel.

One inefficiency of existing MoD systems is their capacity limitation (i.e. such systems are typically restricted to two passengers). One study in New York City showed that up to 80% of the taxi trips in Manhattan could be shared by two riders, with an increase in travel time of only a few minutes. However, prior art techniques for assigning ride sharing and analyzing benefits was: (i) limited to two riders for an optimal allocation (three with heuristics); (ii) intractable for larger number of passengers; and (iii) did not allow for allocation of additional riders after the start of a trip (see 5. Santi P, et al. (2014) Quantifying the benefits of vehicle pooling with shareability networks. *Proc Natl Acad Sci USA* 111(37):13290-13294). Primarily due to the lack of efficient and scalable techniques, there are no studies of this scale that quantify the benefits of larger-scale ride pooling.

Much of the existing literature directed toward fleet management for MoD systems considers the case of ride-sharing without pooling requests, focusing on fluid approximations, queuing based formulations, case studies in specific regions (e.g., Singapore), and operational considerations for fleet managers. With the growing interest and rapid developments in autonomous vehicles, there is also an increasing focus on autonomous MoD systems.

It would, however, be desirable to provide a system and method which considers the ridesharing problem of servicing multiple rides with a single trip.

SUMMARY

It has been recognized herein that the ridesharing problem is related to the vehicle-routing problem and the dynamic pickup and delivery problem in which spatiotemporally distributed demand must be picked up and delivered within prespecified time windows.

It has also been recognized that one challenge when addressing this problem is the need to explore a very large decision space, while computing solutions fast enough to provide users with the experience of real-time booking and ride service.

It would therefore, be desirable to provide a system and technique which improves, and ideally fully address the potential of ride-sharing services.

In one aspect of the concepts described herein, described are a system and technique for real-time high-capacity ride-sharing that (i) scales to large numbers of passengers and trips and (ii) dynamically generates optimal routes with respect to online demand and vehicle locations is described.

In one embodiment, the system and techniques may be used to implement ridesharing with rider capacity of up to 10 simultaneous passengers per vehicle.

In another aspect of the disclosed concepts, described is a ridesharing technique which utilizes a reactive anytime optimal method (i.e. a method that efficiently returns a valid assignment of travel requests to vehicles and then refines it over time, converging to an optimal solution).

With this particular arrangement, a system and technique for controlling a fleet of vehicles with varying occupant capacities which address both the problems of assigning vehicles to matched passengers and rebalancing—or repositioning—the fleet to service demand is provided. The system and method described herein solve the unified problem of passenger and vehicle assignment in a computationally efficient manner at a large scale and demonstrates the capability of operating a real-time MoD system with multiple service tiers (shared-taxi, shared-vans, and shared-buses) of varying capacity. If enough computational resources are available, the optimal assignment for the current requests and time would be found; otherwise, the best solution found so far (e.g. within a selected, determined or measured period of time) is returned.

In another aspect of the disclosed concepts, described is a system which utilizes a reactive anytime optimal method (i.e. a method that efficiently returns a valid assignment of travel requests to vehicles and then refines it over time, converging to an optimal solution). If enough computational resources are available, the optimal assignment for the current requests and time would be found; otherwise, the best solution found within given limitations (e.g. a given time limit) is returned.

In accordance with a further aspect of the concepts described herein, a technique for assigning ridesharing requests to vehicles includes (a) receiving current requests for rides from one or more vehicles within a fleet of vehicles within a window; (b) generating a pairwise request-vehicle shareability graph (RV-graph); (c) generating a generating a request-trip-vehicle graph (RTV-graph) of trips and the vehicles that can serve them; (d) solving an integer linear program(ILP) to determine an assignment of vehicles to trips; and (e) assigning specific vehicles from the fleet of vehicle to specific trips.

With this particular arrangement, a technique for assigning ridesharing requests to vehicles which is efficient and scalable is provided. In embodiments, the method starts from a greedy assignment and improves it through a constrained optimization, quickly returning solutions of good quality and converging to the optimal assignment over time. In embodiments, the method further includes determining the feasibility of trips in the RTV-graph. In embodiments, the method further includes rebalancing idle vehicles to areas with high demand. In embodiments, the method further is applied to a fleet of autonomous vehicles. In embodiments, tradeoffs may be made between fleet size, capacity, waiting time, travel delay, and operational costs for low- to medium-capacity vehicles, such as taxis and van shuttles and desired performance.

In one embodiment, a highly scalable anytime optimal technique is described. In embodiments, such a system and technique the system and technique can be applied such that in a shared vehicle fleet with passenger capacities of up to ten, 2,000 vehicles (15% of the taxi fleet) of capacity 10 or 3,000 of capacity 4 can serve 98% of the demand within a mean waiting time of 2.8 min and mean trip delay of 3.5 min.

The described system and techniques may be applied to fleets of autonomous vehicles and also incorporates rebalancing of idling vehicles to areas of high demand. This technique framework is general and can thus be used for many real-time multivehicle, multitask assignment problems.

In another aspect of the concepts sough to be protected herein, it has recognized that some traditional approaches that rely on an integer linear program (ILP) formulation (such as Cordeau JF (2006) A branch-and-cut technique for the dial-a-ride problem. *Oper Res* 54(3):573-586), also provide anytime guarantees for the multivehicle-routing problem.

However, in contrast to the approach described herein, the applicability of prior art approaches is limited to small problem instances (e.g. 32 requests and 4 vehicles, with a computation cost of several minutes in the above cited JF Cordeau reference).

And while the techniques and systems described herein also rely on an ILP formulation, they do not explicitly model the edges of the road network in the ILP. Thus, the approach described herein scales to much larger problem instances. For example, the techniques and systems described herein can provide real time solutions to large problem instances such as New York City, with thousands of vehicles, requests, and road segments.

The approach described herein decouples the problem by first computing feasible trips from a pairwise shareability graph and then assigning trips to vehicles. It is shown that this assignment can be posed as an ILP of reduced dimensionality. The framework allows for flexibility in terms of prescribing constraints such as (but not limited to) maximum user waiting times and maximum additional delays due to sharing a ride. The method also be extended to proactively rebalance the vehicle fleet by moving idle vehicles to areas of high demand.

Detailed experimental results of an illustrative embodiment are presented for a subset of 3 million rides extracted from the New York City taxicab public dataset. It is shown that 3,000 vehicles with a capacity of 2 and 4 could serve 94 and 98% of the demand with a mean waiting time of 3.2 and 2.7 min, and a mean delay of 1.5 and 2.3 min, respectively. To achieve 98% service rate, with comparable waiting time (2.8 min) and delay (3.5 min), a fleet of just 2,000 vehicles with a capacity of 10 was required. This fleet size is 15% of the active taxis in New York City. One also shows that our approach is robust with respect to the density of requests and could therefore be applied to other cities.

The system described herein operates in real time and is particularly well suited for use with autonomous vehicle fleets that can continuously reroute based on real-time requests. It can also rebalance idle vehicles to areas with high demand and is general enough to be applied to other multivehicle, multitask assignment problems.

In accordance with a further aspect of the concepts described herein, a system for controlling and continuously rerouting an fleet of vehicles based up on real-time ride requests includes (a) means for receiving current requests for rides from one or more vehicles within a fleet of vehicles within a window; (b) means for generating a pairwise request-vehicle shareability graph (RV-graph); (c) means for generating a generating a request-trip-vehicle graph (RTV-graph) of trips and the vehicles that can serve them; (d) means for solving an integer linear program(ILP) to determine an assignment of vehicles to trips; and (e) means for assigning specific vehicles from the fleet of vehicle to specific trips.

With this particular arrangement, a system for controlling a fleet of vehicles with varying passenger capacities which address both the problems of assigning vehicles to matched passengers and rebalancing—or repositioning—the fleet to service demand is provided. One show how the unified problem of passenger and vehicle assignment can be solved in a computationally efficient manner at a large scale, thereby demonstrating the capability to operate a real-time MoD system with multiple service tiers (shared-taxi, shared-vans, and shared-buses) of varying capacity.

In embodiments, the fleet of vehicles may include one or more autonomous vehicles.

In embodiments, the fleet of vehicles may be provided as a fleet of autonomous vehicles.

In embodiments, the system may further comprise means for rebalancing idle vehicles (either autonomous or non-autonomous vehicles) to areas with high demand.

In accordance with a further aspect of the concepts described herein, a method for controlling and continuously rerouting a fleet of vehicles based up on real-time ride requests, includes (a) receiving current requests for rides from one or more vehicles within a fleet of vehicles within a window; (b) generating a pairwise request-vehicle shareability graph (RV-graph); (c) generating a generating a request-trip-vehicle graph (RTV-graph) of trips and the vehicles that can serve them; (d) solving an integer linear program(ILP) to determine an assignment of vehicles to trips; and (e) assigning specific vehicles from the fleet of vehicle to specific trips.

With this particular arrangement, a method for controlling a fleet of vehicles with varying passenger capacities and which address both the problems of assigning vehicles to matched passengers and rebalancing—or repositioning—the fleet to service demand is provided. It is shown how the unified problem of passenger and vehicle assignment can be solved in a computationally efficient manner at a large scale, thereby demonstrating the capability to operate a real-time MoD system with multiple service tiers (shared-taxi, shared-vans, and shared-buses) of varying capacity.

In embodiments, the method may control either or both of autonomous vehicles and non-autonomous vehicles. In embodiments, the method may control one or more autonomous vehicles. In embodiments, the method may control a fleet of only autonomous vehicles. In embodiments, the method may control a fleet of only non-autonomous vehicles.

In embodiments, the method may further comprise rebalancing idle vehicles (either autonomous or non-autonomous vehicles) to areas having a high demand or ride requests.

It should be appreciated that the concepts, systems and techniques described herein find use in a variety of different applications including, but not limited to: routing of vehicles, taxi/shuttle/bus/boat ride sharing, package delivery, logistics and multi-vehicle multi-task assignment.

BRIEF DESCRIPTION OF THE DRAWINGS

The foregoing features may be more fully understood from the following description of the drawings in which:

FIG. 1 E is a diagram illustrating optimal vehicle assignments given by the method of FIG. 1 (i.e. a solution of the Integer Linear Program (ILP)), where vehicle 1 serves requests 2 and 3 and vehicle 2 serves requests 1 and 4;

FIG. 4A is a plot of mean number of passengers per vehicle vs. time for four different vehicle types (capacity one, two, four, and ten) over a one-week time period for a vehicle fleet size of 1000 vehicles and a maximum waiting time of two (2) minutes;

FIG. 4B is a plot of mean number of passengers per vehicle vs. time for four different vehicle types (capacity one, two, four, and ten) over a one-week time period for a vehicle fleet size of 1000 vehicles and a maximum waiting time of seven (7) minutes;

FIG. 4C is a plot of mean number of passengers per vehicle vs. time for four different vehicle types (capacity one, two, four, and ten) over a one-week time period for a vehicle fleet size of 3000 vehicles and a maximum waiting time of two (2) minutes;

FIG. 4D is a plot of mean number of passengers per vehicle vs. time for four different vehicle types (capacity one, two, four, and ten) over a one-week time period for a vehicle fleet size of 3000 vehicles and a maximum waiting time equal to seven (7) minutes;

DETAILED DESCRIPTION

Figure 1A:
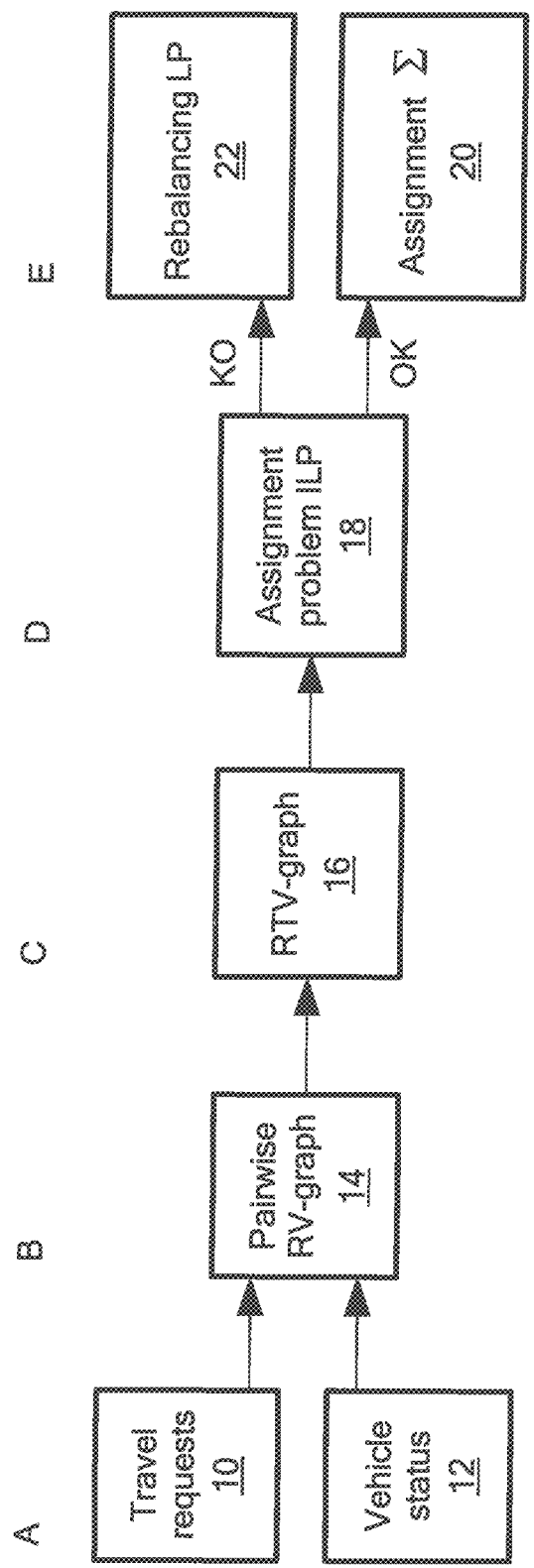
FIG. 1A is a flow diagram of a method for batch assignment of multiple ride requests to multiple vehicles of capacity v.

Before describing concepts, systems, devices and techniques and details of a ridesharing system and technique for assigning travel requests to vehicles and finding optimal routes for the vehicle fleet, some introductory concepts and terminology are explained.

As used herein, the term "ridesharing" refers to the sharing of vehicles by persons. One form of ridesharing, for example, is carpooling. Carpooling may be described as the sharing of a vehicle (e.g. a passenger vehicle such as a car) by two or more persons so that more than one-person travels in a car. Another form of ridesharing is vanpooling. Vanpools are an element of a transit system that allow groups of people to share a ride similar to a carpool, but on a larger scale with concurrent savings in fuel and vehicle operating costs. A special case of ridesharing is referred to "ridepooling" where multiple requests may be served by the same vehicle simultaneously.

Vehicles in a ridesharing operation may be provided by individuals, individuals in cooperation with various public and private support programs, by companies (e.g. private taxi cab companies) through a program operated by or on behalf of an element of government, or a program operated by or on behalf of a public or private employer.

An important concept of ridesharing is that people share a vehicle while travelling from one or more common or disparate starting locations (or "origins") to different or a common ending location (or "destination"). Thus, each person may have different starting locations and different ending locations, each person may have different starting locations and the same (or substantially the same) ending location (e.g. a common destination such as a work center such as an office building, or corporate campus, or an educational campus, for example), each person may have the same starting location (e.g. a common meeting place) and different ending locations or each person may have the same starting location (e.g. a common meeting place) and a common ending location.

Ridesharing may be real-time ridesharing—e.g. a form of taxi-like service in which vehicles may, for example, be operated by independent contractors who may receive requests for rides (i.e. ride-requests) online (e.g. over the internet using a third-party matchmaking application) and provide transport services (e.g. rides) to people in real-time.

Furthermore, ridesharing may be conducted as peer-to-peer ridesharing. Peer-to-peer ridesharing can be divided along a spectrum ranging from commercial, for-fee transportation network companies to for-profit ridesharing services to informal nonprofit peer-to-peer carpooling arrangements. Many modern peer-to-peer ridesharing schemes rely on web applications and/or mobile app technology available to potential users (e.g. people seeking some form of rideshare arrangement).

In general overview, described herein is a framework for techniques and systems for solving the real-time ride-pooling problem with (i) arbitrary numbers of passengers and trips, (ii) anytime optimal rider allocation and routing dependent on the fleet location, and (iii) online rerouting and assignment of riders to existing trips.

The techniques described herein address the problems of both optimally assigning one or more travel requests R (e.g. online travel requests) to one or more vehicles in a fleet of vehicles and finding routes for at least the assigned vehicles in the vehicle fleet. Ideally, and as will be described in detail below, (e.g. with respect to some cost function, an example of which will be provided herein below) the assignments of travel requests to vehicles are optimal or near-optimal assignments and the routes for the vehicle fleet are optimal or near-optimal routes.

In the description provided hereinbelow, considered is a fleet V of m vehicles of capacity v, where v represents the maximum number of passengers each vehicle can have at any given time. An individual travel request r may be one of a set of travel requests R (i.e. $R=\{r_1, \ldots, r_n\}$).

Also, as used herein, the term "passenger" is defined as a traveler (e.g. a person) who has submitted a travel request (e.g. a past travel request) and has been picked up by a vehicle and that is now in route to its destination and the term $P_v$ denotes a set of passengers for vehicle of the fleet (i.e. v∈V).

FIG. 1 illustrates an anytime optimal process for batch assignment of a set of requests $R=\{r_1 \ldots r_n\}$ to a set of vehicles $V=\{v_1 \ldots v_m\}$, which: (1) reduces (and ideally minimizes) a cost function C (to be described below); (2) satisfies a set of constraints Z (to be described below); and (3) allows for multiple passengers per vehicle. It should be appreciated that the fleet may be the entire set of vehicles but need not be (i.e. the set of vehicles may be some or all of the fleet of vehicles). Also included the process of FIG. 1 is an optional process to rebalance a fleet of vehicles (to which the set of vehicles V belongs). It should be appreciated that rebalancing can be done on the entire fleet of vehicles or less than the entire fleet of vehicles. For example, rebalancing may be done on just the set of vehicles V by driving idle vehicles to areas of high demand, where those vehicles are likely to be required in the future.

Turning now to FIG. 1A, a method for batch assignment of multiple ride requests to multiple vehicles of capacity v begins as shown in processing blocks 12 and 14 in which one or more travel requests 12 and one or more indicators of vehicle status 14 are received. Each travel request includes at least a time of request, a pickup location and a drop-off location. The number of vehicles for which a vehicle status is received may be some or all of the vehicles in the fleet.

Figure 1B:
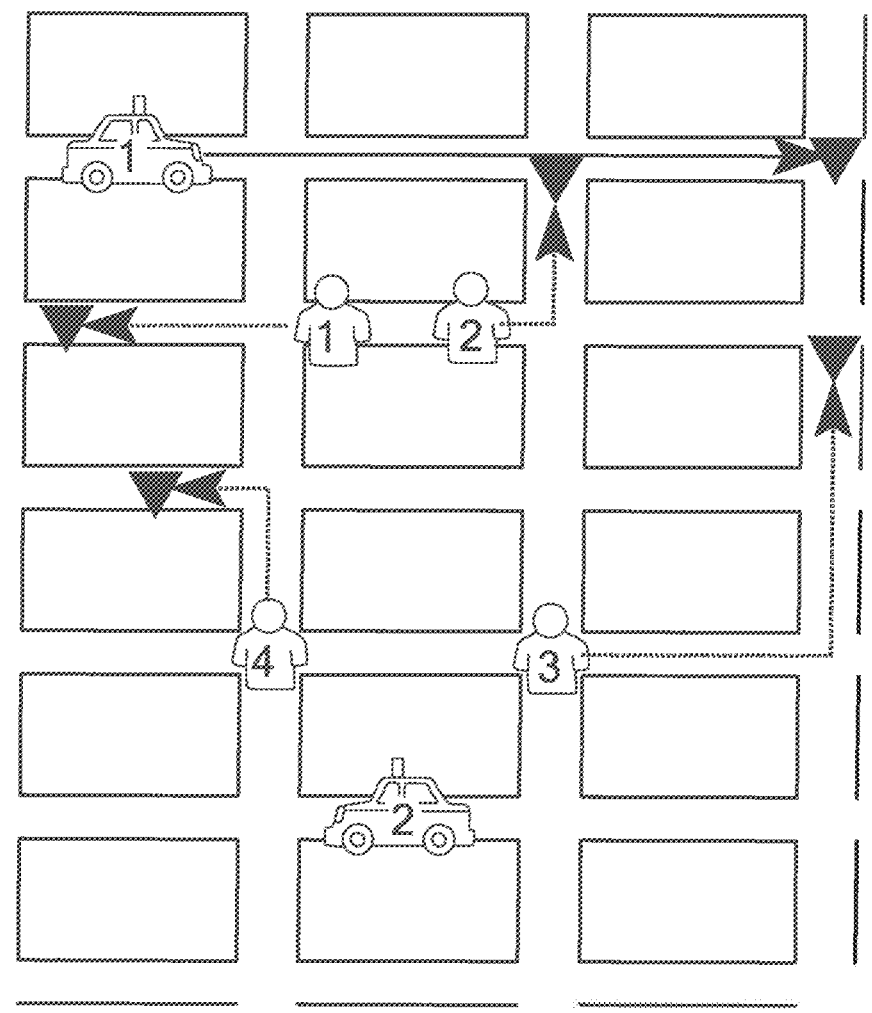
FIG. 1B is a diagram of an illustrative street network with four requests and two vehicles with a first one of the vehicles having one passenger and a second one of the vehicles being empty of passenger-occupants.

Referring briefly to FIG. 1B, an example scenario includes an illustrative street network with four requests (orange human, origin; red triangle, destination) and two vehicles (yellow car, origin; red triangle, destination of passenger). Vehicle 1 has one passenger, and vehicle 2 is empty.

Figure 1C:
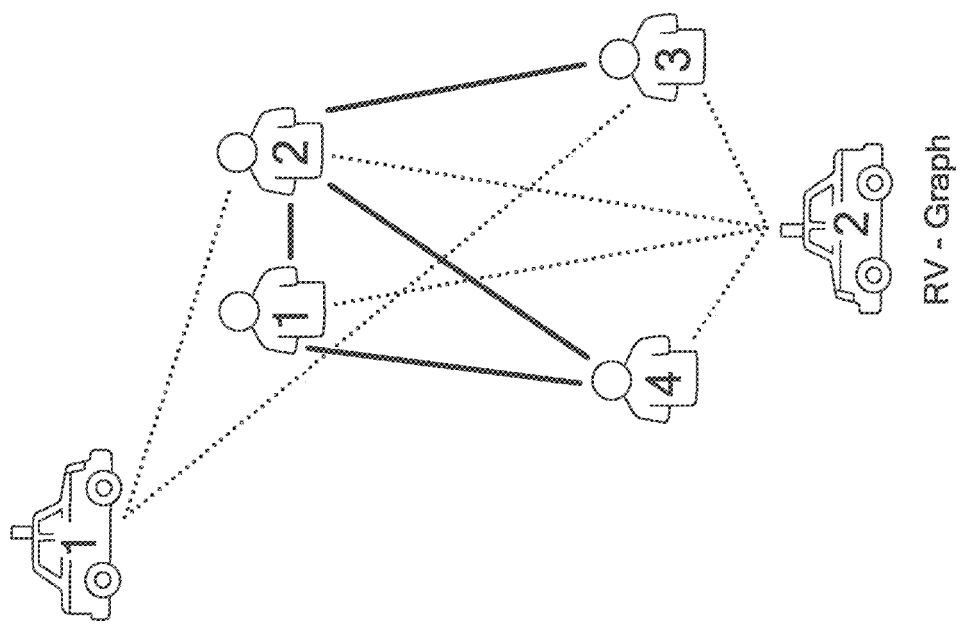
FIG. 1C is a pairwise shareability RV-graph of requests and vehicles. Cliques of this graph are potential trips.
Figure 1F:
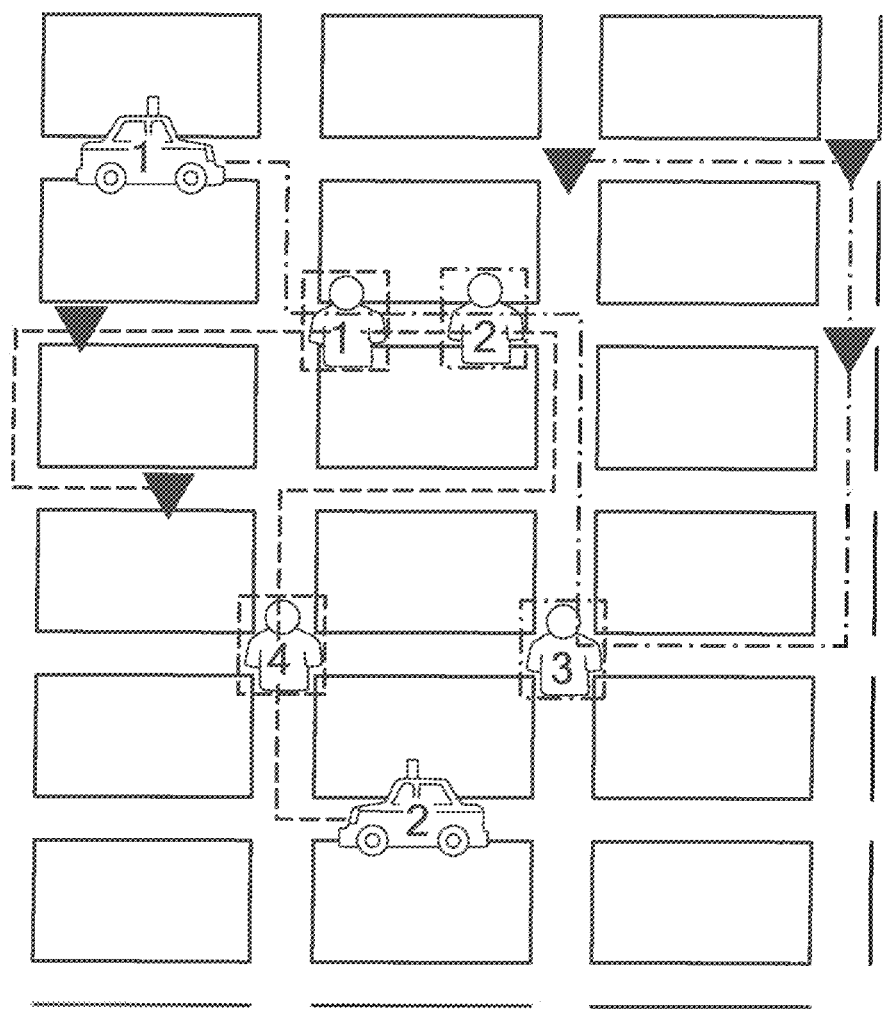
FIG. 1F is a diagram illustrating planned routes for the two vehicles and their assigned requests. In this case, no rebalancing process is required because all requests and vehicles are assigned.
Figure 2:
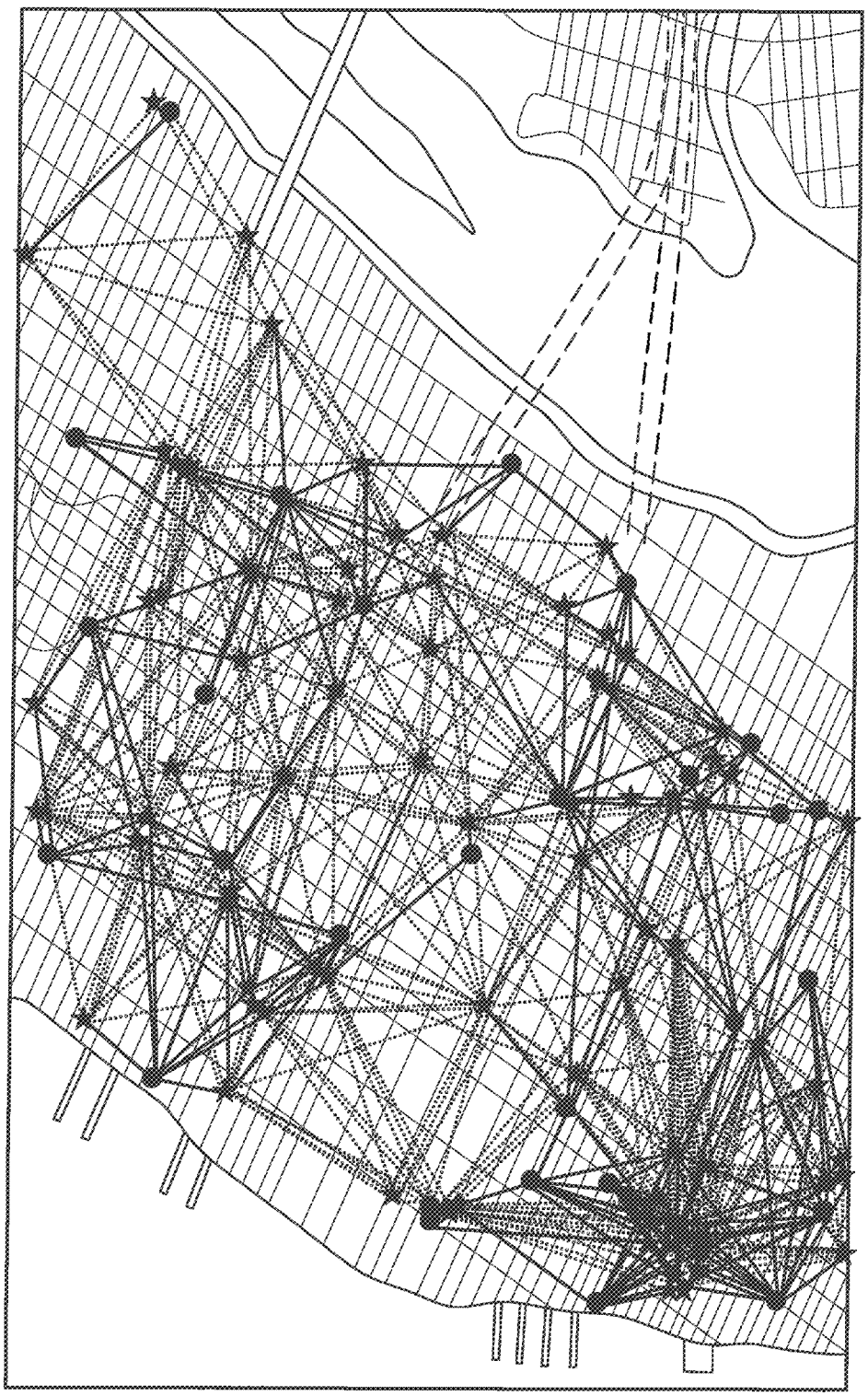
FIG. 2 is a diagram of an illustrative pairwise RV-graph.

Turning again to FIG. 1A, after receipt of at least some travel requests and vehicle status indicators, a pairwise request-vehicle graph (RV-graph) is formed as shown in processing block 14. The RV-graph represents which requests and vehicles might be pairwise-shared, and significantly, also includes the vehicles at their current state. FIG. 1C is an RV-graph for the scenario of FIG. 1B while FIG. 2 is an example of a more complex RV-graph having 90 requests (star) and 30 vehicles (circle) with edges between two requests in dotted red and between a request and a vehicle in solid green. The maximum waiting time and delay are three and six minutes in this example.

Processing then proceeds to processing block 16 in which a round trip vehicle graph (RTV graph) is formed. In particular cliques of the RV-graph (or regions for which its induced subgraph is complete) are explored to find feasible trips and are used to compute the RTV-graph in a manner to be described below. Suffice it here to say that the RTV-graph is used to determine if a trip is feasible (i.e. the RTV-graph is used to determine whether all of the requests can be picked up and dropped off by some vehicle, while satisfying one or more constraints).

Processing then proceeds to processing block 18 in which assignment problem Integer Linear Program (ILP) processing is performed. In embodiments, an anytime optimal technique may be used for batch assignment of a set of requests $R=\{r_1, \ldots r_n\}$ to a set of vehicles $V=\{v_1, \ldots v_m\}$ which: (1) optimizes (and ideally minimizes) a cost function C; (2) satisfies a set of constraints Z; and (3) allows for multiple passengers per vehicle.

Solutions from the ILP processing 18 are provided to processing block 20 in which assignment processing (i.e. the actual assigning of requests to vehicles) is performed.

Solutions from the ILP processing 20 may also optionally be provided to processing block 22 where rebalancing is performed. Such rebalancing is accomplished, at least in part, by moving idle vehicles to areas in which those vehicles are likely to be required in the future (i.e. so-called "areas of high demand"). In embodiments, "regions of high demand" may generally be defined as regions where there are more requests than those that can be serviced with the vehicles in the region. It should be appreciated that the concepts and techniques described herein need not consider specifically defined regions, but rather do an assignment of "idle" vehicles to "ignored" requests, where an ignored request is a request that was not assigned to any vehicle in the assignment step. Details of rebalancing are described hereinbelow.

It should be appreciated that in some instances, it may be possible that only assignment processing is required while in other instances it may be possible that only rebalancing processing while in still other instances assignment processing and rebalancing processing may both be required.

It should also be appreciated that the formulation illustrated in FIG. 1A is flexible with respect to physical and performance-related constraints that might need to be added (i.e. it is possible to add, modify or otherwise incorporate different physical and/or performance-related constraints.

In an illustrative implementation consistent with the broad concepts describe herein, the following rules are considered:
(i) for each request r, the waiting time $\omega_r$, given by the difference between a pickup time $t_r^p$ and a request time $t_r^r$, must be below a maximum waiting time $\Omega$, for example, 2 minutes;
(ii) for each passenger or request r the total travel delay $\delta_r = t_r^d - t_r^*$ must be lower than a maximum travel delay $\Delta$, for example, 4 min, where
  $t_r^d$ corresponds to a drop-off time of a request r; and
  $t_r^* = t_r^r + \tau(o_r, d_r)$ corresponds to the earliest possible time at which the destination could be reached if the shortest path between the origin $o_r$ and the destination $d_r$ was followed without any waiting time and wherein the total travel delay $\delta_r$ includes both the in-vehicle delay and the waiting time.
(iii) for each vehicle v, a maximum number of passengers, $n_p^{pass} \leq \nu$ (for example, capacity 10).

The cost C of an assignment is defined as the sum of the total travel delays $\delta_r$ (which includes the waiting time) over all assigned requests and passengers, plus a large constant $c_{ko}$ for each unassigned request.

Given an assignment $\Sigma$ of requests to vehicles, the set of requests that have been assigned to some vehicle is denoted as $R_{ok}$ and the set of unassigned requests (e.g. due to the constraints or the fleet size) is denoted $R_{ko}$. This constrained optimization problem may be formally express as:

$$C(\Sigma) = \Sigma_{v \in V} \Sigma_{r \in R_{ok}} \delta_r + \Sigma_{r \in R_{ko}} c_{ko}. \quad (1)$$

This constrained optimization problem represented by Eq. 1 may be solved via the process as illustrated in FIGS. 1A and 1C-1F which are: (1) computing a pairwise request-vehicle shareability graph (RV-graph), as illustrated, for example, in FIG. 1C; (2) computing a graph of feasible trips and the vehicles that can serve them (RTV-graph) as illustrated, for example, in FIG. 1D; (3) solving an ILP to compute the assignment of vehicles to trips (and ideally to compute optimal assignment of vehicles to trips) as illustrated, for example, in FIG. 1E; and optionally (4) rebalancing remaining idle vehicles. It should be appreciated that in FIG. 1F, no rebalancing processing process is required because all requests and vehicles are assigned. The details of an illustrative a rebalancing process are described below.

Given a network graph with travel times, a so-called "travel function" for single-vehicle routing may be formed and expressed as travel (v, Rv). For a vehicle v, with passengers $P_v$, this function returns a travel route (and ideally an optimal or near-optimal travel route) $\rho_v$ to satisfy requests $R_v$. This route reduces (and ideally minimizes) a sum of delays (e.g. the sum of delays $\Sigma_{r \in P_v \cup R_v} \delta_r$) subject to one or more constraints Z (e.g. one, some (e.g. a subset) or all of: waiting time, delay, and capacity). Other constraints, may of course, also be used.

For vehicles having a relatively low (or small) occupant capacity, such as a sedan style taxi cab, the optimal path can be computed via an exhaustive search. For vehicles with larger capacity (e.g. greater than five (5) total occupants), heuristic methods such as the Lin-Kernighan technique (as described, for example, in Helsgaun K (2000) An effective implementation of the Lin-Kernighan traveling salesman heuristic. *Eur J Oper Res* 126(1):106-130), the Tabu Search technique (as described, for example, in Glover F, Laguna M (2013) Tabu Search? (Springer, Berlin); or a simulated annealing approach (as described, for example, in Pham DT, Karaboga D (2012) Intelligent Optimisation Techniques: Genetic Algorithms, Tabu Search, Simulated Annealing and Neural Networks (Springer Science & Business Media, Berlin) may be used. Furthermore, other techniques known to those of ordinary skill in the art, may of course, also be used.

As noted above in conjunction with the example of FIG. 1C, the RV-graph represents which requests and vehicles might be pairwise-shared and builds on the idea of share-ability graphs. Significantly the RV-graph described herein also includes the vehicles at their current state. One vehicle stat is "$V_{idle}$," which is defined as: vehicle is empty and unassigned to any request (it might be in movement if it was rebalancing in the previous step). Other vehicle states include, but are not limited to, empty en route to pick some passenger; rebalancing; with # passengers, where # can be 1,2,3, ... v (max vehicle capacity).

The method begins by computing (a) which requests can be pairwise combined, and (b) which vehicles can serve which requests individually, given their current passengers (i.e. compute a pairwise graph of vehicles and requests—i.e. an RV-graph). This builds on the idea of share-ability graphs, but is it not limited to the requests and includes the vehicles at their current state as well.

In the described processing, two requests r1 and r2 are connected if some empty vehicle starting at the origin of one of them could pick up and drop off both requests while satisfying one or more designated constraints Z. A cost $\delta_{r1} + \delta_{r2}$ is associated to each edge e(r1, r2). Similarly, a request r and a vehicle v are connected if the request can be served by the vehicle while satisfying the constraints Z, as given by the travel function travel(v, r). The edge is denoted as e(r, v).

Figure 1D:
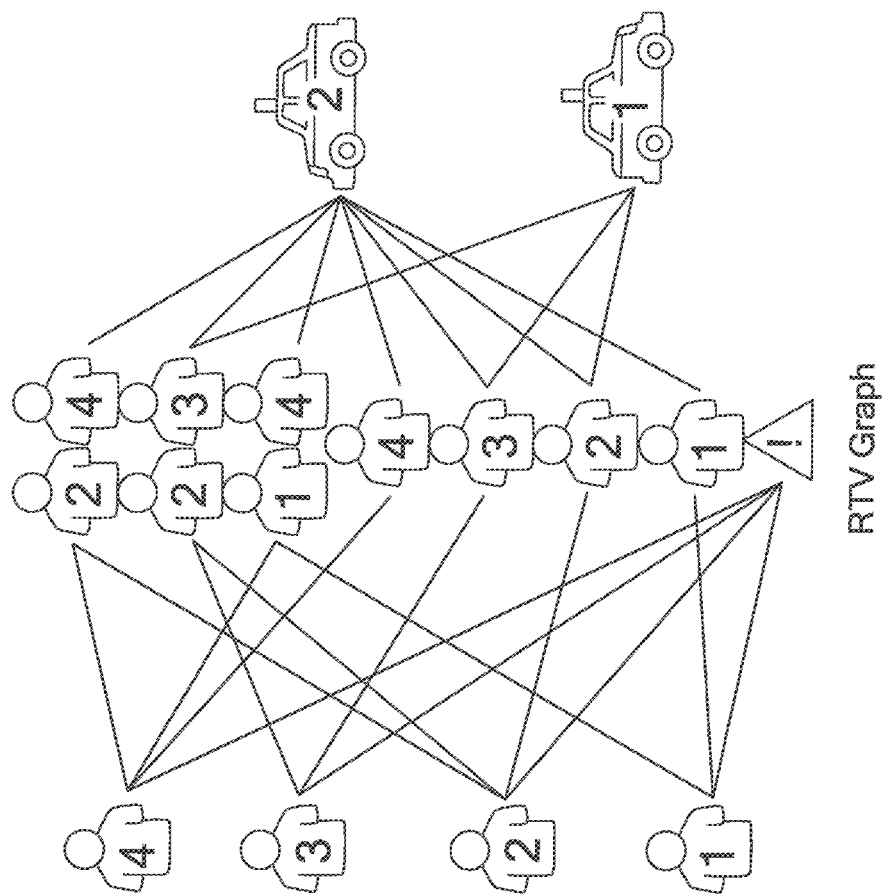
FIG. 1D is an RTV-graph of candidate trips and vehicles which can execute them. A node (yellow triangle) is added for requests that cannot be satisfied.

Next, the cliques of the RV-graph—or regions for which its induced subgraph is complete—are explored to find feasible trips and compute an RTV-graph (e.g. as illustrated in FIG. 1D). A trip $T = \{r_1, \ldots r_{nT}\}$ is a set of nT requests (where n is the number of passengers) to be combined in one vehicle. A trip is feasible if all of the requests can be picked up and dropped off by some vehicle, while satisfying some. most or all of the constraints Z.

As noted above, a trip is feasible if all of the requests can be picked up and dropped off by some vehicle, while satisfying the constraints Z and thus it is necessary to determine which trips are feasible trips. There may exist several trips of varying size that can service a particular request. In addition, more than one vehicle might be able to service a trip. Once feasible trips are identified, the assignment process will ensure that each request and vehicle are assigned to a maximum of one trip.

With reference to FIG. 1D, it should be noted that an RTV-graph contains two types of edges: a first type of edge is denoted e(r; T) corresponding to edges between a request r and a trip T that contains request r (i.e., ∃ e(r,T)↔r∈T); and a second type of edge is denoted e(T, v), corresponding to edges between a trip T and a vehicle v that can execute the trip (i.e., ∃ e(T, v)↔travel(v,T) is feasible). The cost $\Sigma_{r \in P_v \cup T} \delta_r$, sum of delays, is associated to each edge e(T,v).

The process to determine the feasible trips and edges proceeds incrementally in trip size for each vehicle, starting from the request-vehicle edges in the RV-graph. An illustrative process (which may be considered as a process for generating an RTV-graph such as that shown in FIG. 1D above) is shown in Table 1 below.

TABLE 1

```
1:   T = ∅
2:   for each vehicle v ∈ V do
3:     T_k = ∅ ∀ k ∈ {1,...,v}
4:     [Add trips of size one]
5:     for e(r,v) edge of RV-graph do
6:       T_1 ← T = {r}; Add e(r,T) and e(T,v)
7:     [Add trips of size two]
8:     for all {r_1}, {r_2} ∈ T_1 and e(r_1,r_2) ∈ RV-graph do
9:       if travel (v,{ r_1,r_2}) = valid then
10:        T_2 ← T = { r_1,r_2}; Add e(r_i,T) and e(T,v)
11:    [Add trips of size k]
12:    for k ∈ {3,..., v} do
13:      for all T_1, T_2 ∈ T_{k-1} with | T_1 ∪ T_2| = k do
14:        Denote T_1 ∪ T_2 = {r_1,..., r_k}
15:        if ∀_i ∈ {1,...,k}, {r_1,..., r_k} \ r_i ∈ T_{k-1} then
16:          if travel (v, T_1 ∪ T_2) = valid then
17:            T_k ← T = T_1 ∪ T_2
18:            Add e(r_i, T), ∀r_i ∈ T, and e(T,v)
19:    T ← ∪_{i∈{1,...,v}} T_i
```

For computational efficiency, one can optionally decide to rely on the fact that a trip T only needs to be checked for feasibility if there exists a vehicle v for which all of its sub-trips T'=T\r (obtained by removing one request) are feasible and have been added as edges e(T', v) to the RTV-graph.

Once feasibility is determined, the assignment of vehicles to trips (and ideally the optimal assignment $\Sigma_{optimum}$ of vehicles to trips) is computed. This optimization is formalized as an ILP, initialized with a greedy assignment (or any other technique well-known to those of ordinary skill in the art that quickly provides a feasible solution) obtained directly from an RTV-graph. To compute the greedy assignment ($\Sigma_{greedy}$,) trips are assigned to vehicles iteratively in decreasing size of the trip and increasing cost (e.g. sum of travel delays). The general concept is to increase (and ideally maximize) the number (i.e. amount) of requests served while reducing (and ideally, minimizing) the cost. An illustrative process is shown in Table 2 below.

TABLE 2

```
1:   R_ok = ∅; V_ok = ∅
2:   for k = v; k > 0; k - - do
3:     S_k := sort e(T, v) in increasing cost, ∀T ∈ T_k, v ∈ V
4:     while S_k ≠ ∅ do
5:       pop e(T, v) ← S_k
6:       if ∀r ∈ T, r ∉ R_ok ∉ V_ok then
7:         R_ok ← {∀r ∈ T}; V_ok ← v
8:         Σgreedy ← e(T, v)
```

Described below is a method to assign trips to vehicles (and ideally, a method to optimally assign trips to vehicles).

1) Variables: A binary variable $\in_{i,j} \in \{0, 1\}$ is introduced for each edge $e(T_i, V_j)$ between a trip $T_i \in T$ and a vehicle $v_j \in V$ in the RTV-graph. If $\in_{i,j}=1$ then vehicle $v_j$ is assigned to trip $T_i$. Denote by $\varepsilon_{TV}$ the set of {i, j} indexes for which an edge $e(T_i, v_j)$ exists in the RTV-graph.

An additional binary variable $X_k \in \{0, 1\}$ is introduced for each request $r_k \in R$. These variables are active, $X_k=1$, if the associated request $r_k$ cannot be served by any vehicle and is ignored.

Denote the set of variables X as:

$$X = \{\in_{i,j}, X_k; \forall e(T_i, v_j) \text{ node in RTV-graph } \forall r_k \in R\}. \quad (1)$$

2) Cost: The cost function C, equivalent to C(Σ) in Equation (1), is given by $$C(X) := \Sigma_{i,j \in \varepsilon_{TV}} c_{i,j} \subset i, j + \Sigma_{K \in \{0, \ldots, n\}} c_{ko} X_k, \quad (3)$$

where the individual costs are given by the sum of delays, $$c_{i,j} = \Sigma_{r \in T_i}(t_r^d = t_r^*), \text{ as returned by travel } (v_j, T_i) \quad (4)$$

and $c_{ko}$ is a large enough constant to penalize ignored requests.

3) Constraints: Two types of constraints are included, as follows.

Each vehicle is assigned to a single trip at most, $$\Sigma_{e \in \rho_{v_j}} \in_{i,j} \leq 1 \quad \forall v_j \in V, \quad (5)$$

Where $\iota_j^v$ denotes the indexes i for which an edge $e(T_i, v_i)$ exists in the TRV-graph. Each request is assigned to a vehicle or ignored, $$\Sigma_{i \in \tau_k^R} \Sigma_{j \in \tau_i^T} \in_{i,j} + X_k = 1 \quad \forall r_k \in R, \quad (6)$$

Where $\tau_k^R$ denotes the indexes for i for which an edge $e(r_k, T_i)$ exists in the RTV-graph and $\tau_i^T$ denotes the indexes j for which an edge $e(T_i, v_j)$ exists in the RTV-graph. This is, the trips of which the request forms part and the vehicles that can service each of those trips.

4) Assignment: The optimal assignment is found by solving an ILP optimization defined by the aforementioned variables, cost and constraints, as shown in Table 3 below.

Starting from the greedy assignment, the ILP can be solved with state of the art solvers via branch and bound with heuristics and duality gap checking. These processes can be parallelized and return a suboptimal solution if stopped before convergence.

It should be noted that the cost function of Eq. 3 is equivalent to Eq. 1 only if the cost term c_i,j of an individual assignment, of trip i to vehicle j, is given by the sum of delays for all current passengers and assigned requests of vehicle i, minus the sum of delays for all current passengers of vehicle i if it were not to take any additional requests.

The optimization problem is formulated in Table 3 below. A binary variable $\in_{i,j} \in \{0,1\}$; is introduced for each edge $e(T_i, v_j)$ between a trip $T_i \in T$ and a vehicle $v_j \in V$ in the RTV-graph. If $\in_{i,j}=1$ then vehicle $v_j$ is assigned to trip $T_i$.

The set of {i, j} indices for which an edge $e(T_i,v_j)$ exists in the RTV-graph, i.e., the set of possible pickup trips is denoted $\varepsilon_{TV}$. An additional binary variable $X_k \in \{0,1\}$ is introduced for each request $r_k \in R$. These variables are active, i.e., $X_k=1$, if the associated request $r_k$ cannot be served by any vehicle and is ignored. The set of variables is then $X = \{\in_{i,j}; Xk, \forall e(T_i, v_j) \text{ edge in RTV-graph and } \forall r_k \in R\}$.

The cost terms $c_{i,j}$ are the sum of delays for trip Ti and vehicle $v_j$ pickup (stored in the $e(T_i, v_i)$ edge of the RTV-graph) and $c_{ko}$ is a large constant to penalize ignored requests.

Two types of constraints are included. Line 3 in Table 3 below imposes that each vehicle is assigned to one trip at most. Line 4 in Table 3 imposes that each request is assigned to a single vehicle or ignored. In these constraints, three sets appear.

The set of trips that can be serviced by a vehicle j, or edges $e(T_j, v_j)$, is denoted as $I_{T=j}^V$.

The set of trips that contain request k, or edges $e(r_k; T_i)$, is denoted as $I_{R=k}^V$.

The set of vehicles that can service trip i, or edges $e(T_i, v_j)$, is denoted as $I_{T=i}^V$.

This ILP is solved incrementally from the greedy assignment $\Sigma_{greedy}$, thereby improving the quality of the assignment over time.

TABLE 3

1: Initial guess: $\Sigma_{greedy}$

2: $\sum_{optim} := \arg_{\chi}^{min} \sum_{i,j \in \varepsilon_{TV}} c_{i,j} \varepsilon_{i,j} + \sum_{k \in \{1,\ldots,n\}} c_{k_o} \chi_k$ 3: s.t. $\Sigma_{i \in \tau_{V=j}} \tau \in i,j \leq 1$   $\forall V_j \in V$
4: $\Sigma_{i \in \tau_{R=k}} \tau \Sigma_{j \in \tau_{T=i}} v \in i,j + \chi_k = 1$   $\forall r_k \in R$ The above method for assigning travel requests to vehicles is well suited for online execution to assign incoming requests r(t) to a fleet of vehicles for which a pool of requests R is maintained where (i) new requests are added as they are received and (ii) requests are removed when they are either (a) picked up by a vehicle or (b) could not be successfully matched to any vehicle within the maximum waiting time (e.g. they are ignored).

In embodiments, requests are collected during a window which may, for example be provided as a time window or an event window. In implementations in which the window is provided as a time window, the time window may be "open," (i.e. the system may accept requests) for a preselected period of time (e.g., 30 seconds). In selecting the size of the time window (i.e. the duration of time for which requests can be collected) the factors to consider include, but are not limited to computational time and resources and a number of requests per minute. Alternatively, in some embodiments, the window could simply be based on a number of requests received rather than based on time (e.g. during "rush hour" or after a "major event" such as a concert or sporting event game) where many requests may be received substantially simultaneously. It is possible to dynamically compute and adjust the size of the window (e.g. either a time-based or non time-based window). For example, the duration of a time window could change based upon a variety of factors, including, but not limited to, the number of requests per minute, computational resources, number of available vehicles, etc . . . .

After expiration of the time window, at least some (and preferably all) of the collected requests are assigned in batch to the different vehicles. If a request is matched to a vehicle at any given iteration, its latest pickup time is reduced to the expected pickup time by that vehicle and the cost $X_{ko}$ of ignoring it is increased for subsequent iterations. A request might be re-matched to a different vehicle in subsequent iterations so long as its waiting time does not increase and until it is picked up by some vehicle. Once a request is picked up (i.e., the request becomes a passenger), it remains in that vehicle and cannot be re-matched. The vehicle may, however, still pick additional passengers. In each iteration, the new assignment of requests to vehicles guarantees that the current passengers (occupants of the vehicle) are dropped off to a desired destination within the maximum delay constraint.

After the assignment, due to fleet imbalances, the set $R_{ko}$ of unassigned requests may not be empty, and some empty vehicles (i.e. vehicles unoccupied except for a driver in the case where the vehicle is not an autonomous vehicle) designated as $V_{idle}$ may still by unassigned to any request. These imbalances may occur when idle vehicles are in areas far away from an area of current requests and/or due to the maximum waiting time and/or delay constraints and/or vehicle capacity. Under the assumptions that (a) ignored requests may wait longer and request again, (b) it is likely that more requests occur in the same area where all requests cannot be satisfied, and (c) there are not enough requests in the neighborhood of the idle cars, the following approach may be used to rebalance the fleet of vehicles by moving only the idle vehicles.

To rebalance the vehicle fleet, after each batch assignment, vehicles having a status of $V_{idle}$ are assigned to requests in $R_{ko}$ to reduce, and ideally minimize, the sum of travel times, with the constraint that either all requests or all of the vehicles are assigned. The process begins by first computing the travel time $T_{v,r}$ of each individual idle vehicle having the status of $V_{idle}$ to pick each individual request in $R_{ko}$, the set of ignored—or not serviced—request and then obtaining an assignment (ideally, an optimum assignment), via a linear program as described in Table 4 below. With this approach, if all requests can be satisfied, some vehicles may remain idle, saving fuel and distance traveled (which may be, for example, the case at nighttime).

TABLE 4

1:  Given: the idle (empty, stopped and unassigned) vehicles $V_{idle}$, and the unassigned requests $R_{ko}$.
2:  Given: the shortest travel time $T_{v,r}$ for vehicle $v \in V_{idle}$ to pick
    request $r \in R_{ko}$.
3:  Variables: $Y = U_{V \in V_{idle}, r \in R_{ko}} y_{v,r}$. Where $y_{v,r} \in \mathbb{R}$ indicates individual assignments
4:
5:  $\sum_{rebalance} := \arg_y^{min} \sum_{V \in V_{idle}} \sum_{r \in R_{ko}} T_{v,r} y_{v,r}$
6:  s.t. $\Sigma_{V \in V_{idle}} \Sigma_{R_{ko}} y_{v,r} = \min(|V_{idle}|, |R_{ko}|)$
    $0 \leq y_{v,r} \leq 1$   $\forall y_{v,r} \in Y$.
7:
8:
9:  Where |.| denotes the number of elements of a set.
10: The solution of this Linear Program is also a solution of the Integer Linear Program with $y_{v,r} \in \{0,1\}$.

Figure 3B:
FIG. 3B is an enlarged view of a portion of the geographic region illustrated in FIG. 3A showing an enlarged view of a scheduled path for a vehicle with four passengers, which drops one off, picks up a new one, and drops all four.
Figure 3A:
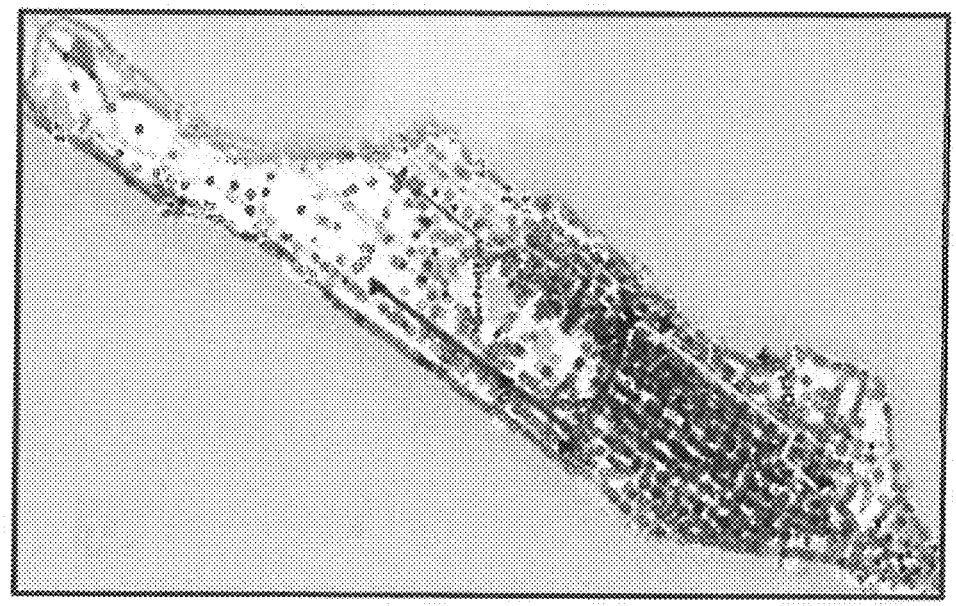
FIG. 3A is an illustration of a geographic region having 2,000 vehicles, capacity of 4.

FIGS. 3A and 3B illustrate an optimal route for a vehicle with four passengers and an additional request.

FIG. 3A is an illustration of a geographic region having 2,000 vehicles, capacity of 4; (=5 min, Wednesday, 2000 hours). Vehicle in the fleet are represented at their current positions.

FIG. 3B is an enlarged view of a portion of the geographic region illustrated in FIG. 3A showing a close view of the scheduled path for a vehicle (dark circle) with four passengers, which drops one off, picks up a new one (star), and drops all four. Drop-off locations are displayed with inverted triangles.

It should be noted that the number of variables in the ILP is equal to the number of edges e(T, v) in the RTV-graph plus the number of requests. In the worst case, the number of variables is of order O(mnv) but only reached with complete RV- and RTV-graphs, where all vehicles can serve all requests and all requests can be combined with each other. In practice, the number of variables is orders of magnitudes lower and related to the size of the cliques in the RV-graph. The number of constraints is n+m.

If all of the steps are executed until termination and exploration of all possible trips and assignments, the described method guarantees optimality of the assignment of the currently active requests, while satisfying the constraints Z. In practice, timeouts can be set both for the amount of time spent generating candidate trips for each vehicle and for the time spent exploring the branches of the ILP. A limit on the number of vehicles considered per request, the number of trips per vehicle, or the optimality gap of the ILP can also be set. These timeouts trade optimality for tractability, and the particular values selected will depend upon the available resources. It should be noted that the described method is reactive in the sense that it provides anytime-optimality guarantees given the current state of the system and the current requests. To inform the assignment and routing about future demand, an additional cost term could be added to Eq. 1, and future requests could be sampled from historical data. The method allows for parallelization in all steps.

In one illustrative system, the performance of a MoD fleet controller using the technique described herein against real data from an arbitrarily chosen representative week, from 0000 hours Sunday, May 5, 2013, to 2359 hours, Saturday May 11, 2013, from a publicly available dataset of taxi trips in Manhattan, New York City is next described. This dataset contains, for each day, the time and location of all of the pickups and drop-offs executed by each of the 13,586 active taxis. From these data, all of the requests (origin and destination within Manhattan) are extracted and the time of request is considered equal to the time of pickup. In this example, the complete road network of Manhattan (4,092 nodes and 9,453 edges) is considered, with the travel time on each edge (road segment) of the network given by the daily mean travel time estimate, computed using a conventional method which may be the same as or similar to the method described in Santi P, et al. (2014) Quantifying the benefits of vehicle pooling with shareability networks. *Proc Natl Acad Sci USA* 111(37):13290-13294. Shortest paths and travel times between all nodes are then precomputed and stored in a lookup table.

In one simulation of the evolution of a taxi fleet, vehicles were initialized at midnight at sampled positions from a historical demand distribution and continuously travel to pick up and drop off passengers to satisfy the real requests extracted from a dataset. Requests were collected during a 30 second time window after which the requested were assigned in batch to the different vehicles. Past requests are kept in the requests pool until picked up and can be reassigned if a better match is found before pickup. Each day contains between 382,779 (Sunday) and 460,700 (Friday) requests, and the running pool of requests contains up to 2,000 requests at any given time. It such a simulation it has been found that the system and methods described herein are robust both with respect to the chosen time window and the density of demands. This is particularly true with results having a time window between 10 and 50 seconds, and having half/double the amount of requests (~220,000/~880,000 per day) in New York City.

Further, several metrics were analyzed, with different vehicle fleet sizes (m ∈ 1,000, 2,000, 3,000} vehicles), vehicle capacities (X ∈{1, 2, 4, 10} passengers), and maximum waiting times (Ω∈{120, 300, 420} seconds). The maximum trip delay Δ is double the maximum waiting time and includes both the waiting time ω and the inside-the-vehicle travel delay. The analysis shows that, thanks to high capacity ride-sharing, a reduced fleet of vehicles (below 25% of the active taxis in New York City) is able to satisfy 99% of the requests, with a mean waiting time and delay of about 2.5 min. All results include rebalancing of idle vehicles to unassigned requests. Experimentally, it is observed that the rebalancing process contributed an increase in the service rate of about 20% and that high vehicle occupancy is achieved in times of high demand, with a large number of the trips being shared. It is observed that many vehicles are located in mid-Manhattan and contain three or four passengers.

Referring now to FIGS. 4A-4D, shown are a series of plots of mean number of passengers per vehicle vs. time for four different vehicle types (capacity one, two, four, and ten). FIGS. 4A-4D show four one-week time series for different fleet sizes and maximum waiting time: (A) 1000 vehicles and=2 min; (8) 1000 vehicles and=7 min; (C) 3000 vehicles and=2 min; and (D) 3000 vehicles and=7 min. At night, most vehicles wait, and during rush hour, the mean occupancy decreases as the fleet gets larger. Larger maximum waiting time enables more opportunities for ride-sharing.

FIGS. 4A-4D thus illustrate that occupancy depends upon the fleet size, capacity, and the maximum waiting/delay time. Lower fleet size, larger capacity and longer waiting/delay times increase the possibilities for ride-sharing and lead to higher mean vehicle occupancy.

Figure 5A:
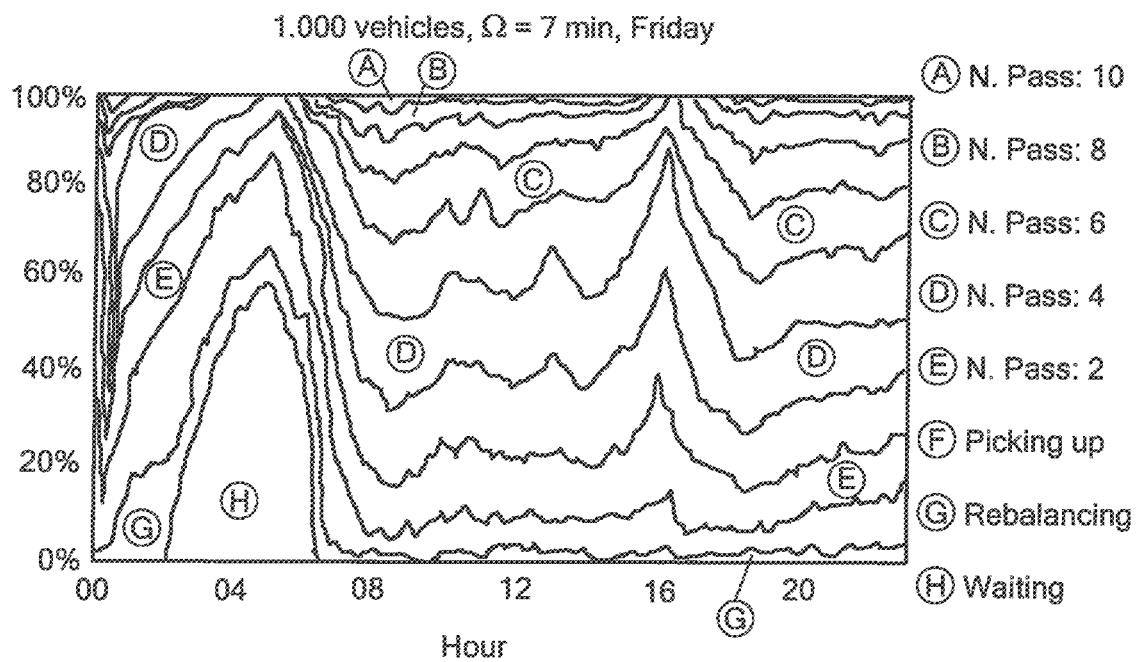
FIG. 5A is a plot of percentage of vehicles in each state (waiting, rebalancing, and number of passengers) vs. time for a representative day (Friday 0000 hours to 2400 hours) with a fleet of 1,000 vehicles of capacity 10 with many opportunities for ride-sharing in high-capacity vehicles.
Figure 5B:
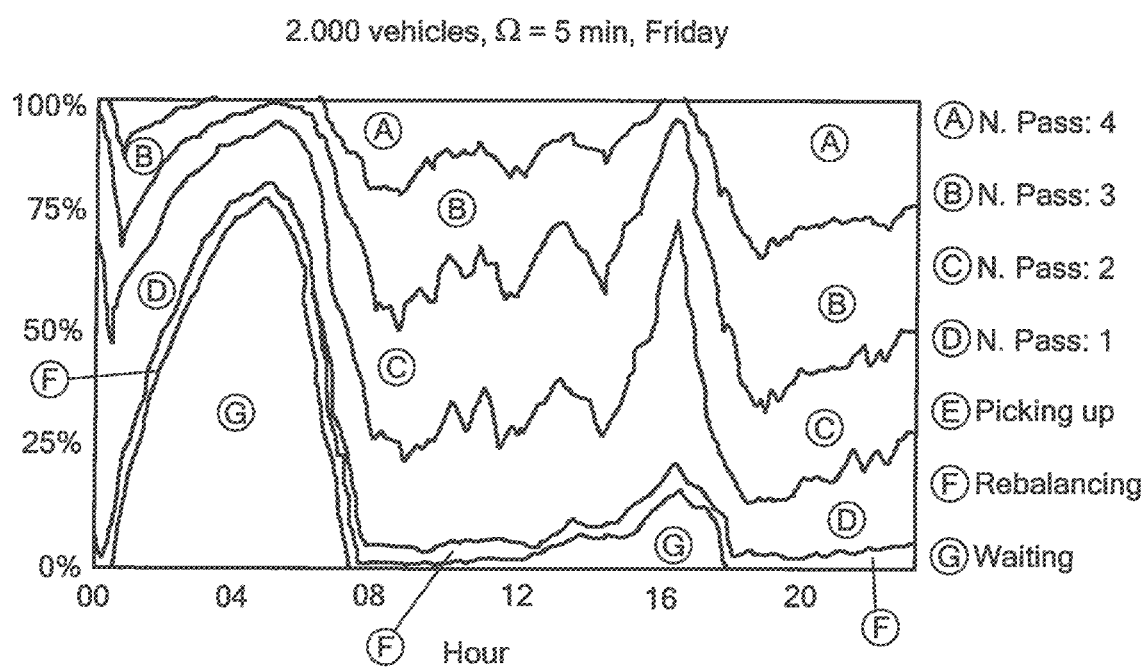
FIG. 5B is a plot of percentage of vehicles in each state (waiting, rebalancing, and number of passengers) vs. time for a representative day with a fleet of 2,000 vehicles of capacity four.

FIGS. 5A, 5B illustrate the percentage of vehicles in each state (waiting, rebalancing, and number of passengers) for a representative day (Friday 0000 hours to 2400 hours). (A) A fleet of 1,000 vehicles of capacity 10 with many opportunities for ride-sharing in high-capacity vehicles. (B) A fleet of 2,000 vehicles of capacity four, showing the utility of full vehicle-sharing.

In FIGS. 5A, 5B, it is observed that during peak hours, a small fleet of high-capacity vehicles does indeed operate at high occupancy. For a fleet of 1,000 vehicles of capacity 10, one observe that, during peak time (1800 hours) of a Friday, 10% of the vehicles have eight or more passengers, 40% of the vehicles have six or more, 80% have three or more, and 98% have at least one passenger. For a fleet of 2,000 vehicles of capacity four, it is observed that, at the same peak time, over 70% of them have at least three passengers onboard.

It is observed that the value of fleets with larger passenger capacities increases with larger Ω and Δ values, as expected, because passengers are willing to incur a larger personal time penalty. High-capacity vehicles are also more important when the fleet size is smaller, because seating capacity might be a bottleneck with smaller fleets.

It is also observed that increasing the vehicle capacity not only increases the service rate but also reduces the mean distance traveled by the vehicles in the fleet (FIG. 6D), potentially leading to a reduction in costs, congestion, and pollution. It is also observed that, with the method described herein (which may be implemented as an online method), about 90% of the rides were shared. The number of shared rides slightly increases with Δ and decreases with the fleet size (FIG. 6E). Finally, it is noted that the system and techniques described herein are real-time capable (FIG. 6F). In the examples described herein, for 300 s, the method is executed in less than 30 s, which is the period for which requests are collected.

FIGS. 6A-6F are a series of plots which may be used to compare several different performance metrics vs. maximum waiting time for varying vehicle capacity (1, 2, 4, and 10 passenger) and varying fleet sizes (fleet sizes of 1,000, 2,000, and 3,000 vehicles).

It should be appreciated that each of FIGS. 6A-6E include three subplots. The subplots included in each of FIGS.

6A-6E are for fleet sizes of 1,000, 2,000, and 3,000 vehicles, respectively. The coordinate axes show increasing maximum waiting time Ω of 2, 5, and 7 min.

Figure 6A:
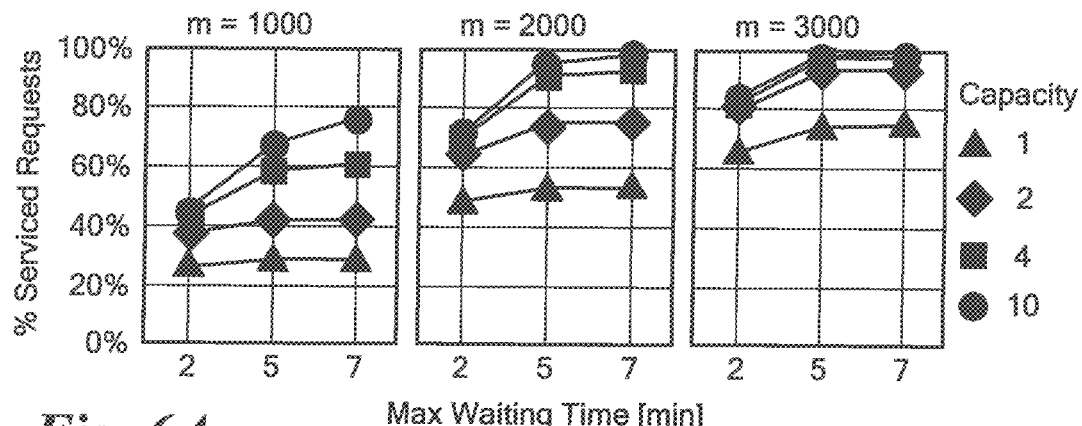
FIG. 6A is a plot of percent of serviced requests vs. maximum waiting time for varying vehicle capacity (1, 2, 4, and 10 passenger) and varying fleet sizes (fleet sizes of 1,000, 2,000, and 3,000 vehicles)

FIG. 6A is a plot of percent of serviced requests vs. maximum waiting time for varying vehicle capacity (1, 2, 4, and 10 passenger) and varying fleet sizes (fleet sizes of 1,000, 2,000, and 3,000 vehicles).

As illustrated in FIG. 6A, a fleet of 1,000 vehicles with a capacity of 10 can satisfy almost 80% of the requests with =420 s, compared with below 30% for a single-rider taxi, for a net gain of over 50%. However, with a larger fleet of 3,000 vehicles and =120 s, the benefit is only about 15%. Interestingly, if longer waiting times and delays are allowed, =420 s, a fleet of 3,000 vehicles with a capacity of 2, 4, and 10 could serve 94, 98, and 99% of the demand. To achieve 98% service rate, a fleet of just 2,000 vehicles with a capacity of 10 was required, which represents a reduction of the fleet size to 15% of the active taxi fleet in New York City.

Figure 6B:
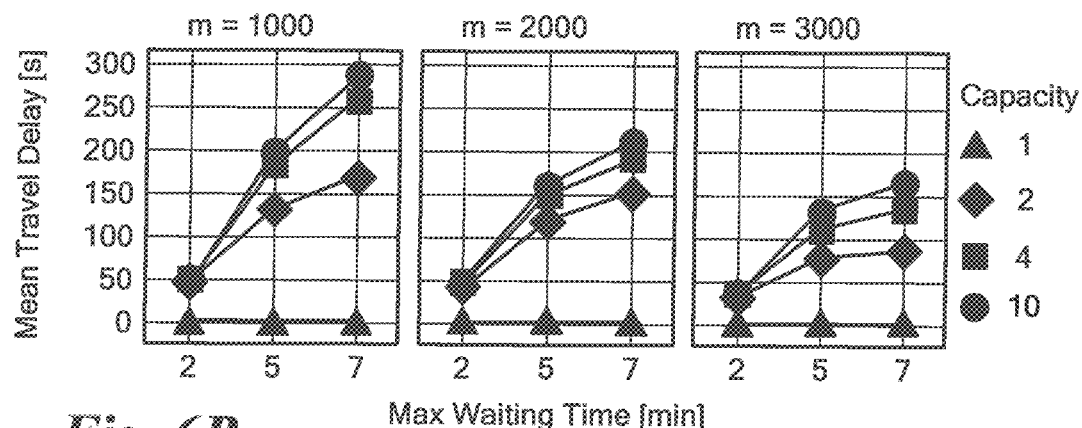
FIG. 6B is a plot of average in car delay $\delta$-$\omega$ vs. maximum waiting time for varying vehicle capacity (1, 2, 4, and 10 passenger) and varying fleet sizes (fleet sizes of 1,000, 2,000, and 3,000 vehicles)

FIG. 6B is a plot of average in car delay δ-ω vs. maximum waiting time for varying vehicle capacity (1, 2, 4, and 10 passenger) and varying fleet sizes (fleet sizes of 1,000, 2,000, and 3,000 vehicles).

Figure 6C:
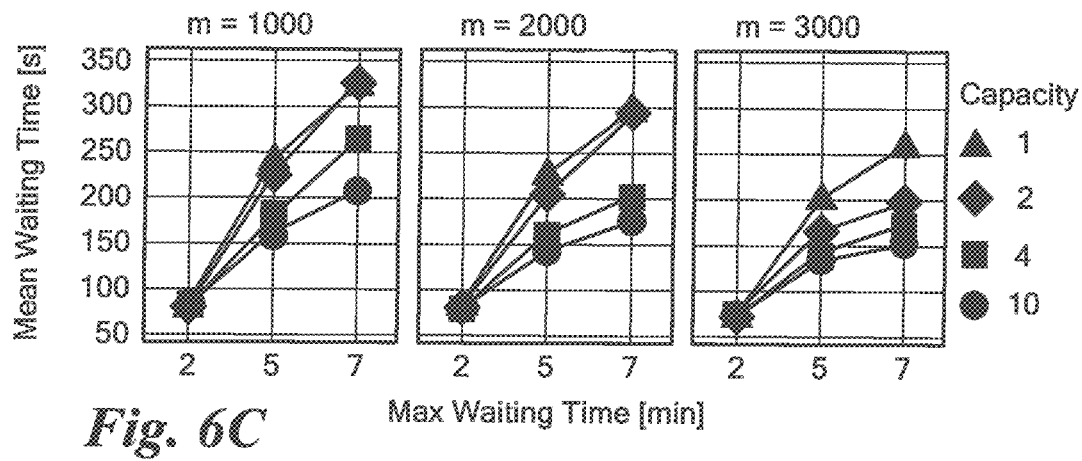
FIG. 6C is a plot of average waiting time $\omega$, vs. maximum waiting time for varying vehicle capacity (1, 2, 4, and 10 passenger) and varying fleet sizes (fleet sizes of 1,000, 2,000, and 3,000 vehicles)

FIG. 6C is a plot of average waiting time w, vs. maximum waiting time for varying vehicle capacity (1, 2, 4, and 10 passenger) and varying fleet sizes (fleet sizes of 1,000, 2,000, and 3,000 vehicles).

As expected, the in-car travel delay does increase with the increase in vehicle capacity (FIG. 68). Nonetheless, that increase seems practically negligible—well below 100 s—once ride-sharing is allowed. Furthermore, the mean waiting time does in fact decrease as vehicle capacity is increased (FIG. 6C). For a fleet size of 1,000 vehicles and=420 s, high-capacity vehicles not only improved the service rate but also achieved a reduction in mean waiting time of over 100 s, which partially offsets the increased in-car delay. In particular, one observeTO_PTO that 3,000 vehicles with a capacity of 2 and 4 could serve 94 and 98% of the demand, with a mean waiting time of 3.2 and 2.7 min and a mean delay of 1.5 and 2.3 min, respectively. To achieve 98% service rate, with comparable waiting time (2.8 min) and delay (3.5 min), a fleet of just 2,000 vehicles with a capacity of 10 was required.

Figure 6D:
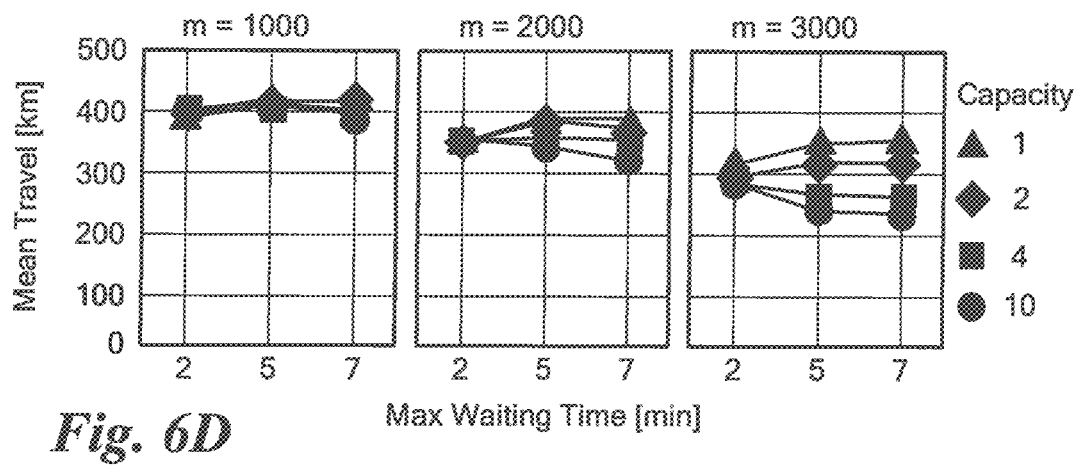
FIG. 6D is a plot of average distance traveled by each vehicle during a single day vs. maximum waiting time for varying vehicle capacity (1, 2, 4, and 10 passenger) and varying fleet sizes (fleet sizes of 1,000, 2,000, and 3,000 vehicles)
Figure 6E:
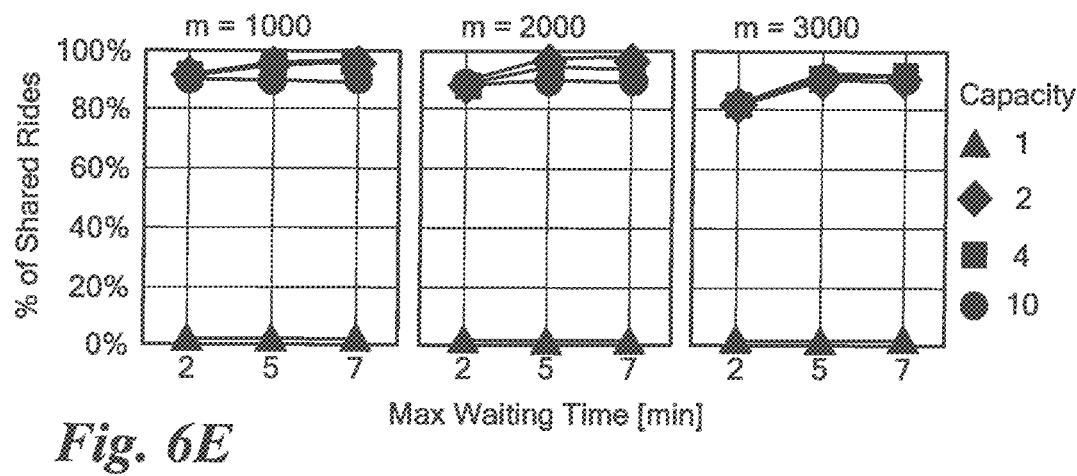
FIG. 6E is a plot of percentage of shared rides (number of passengers who shared a ride divided by the total number of picked-up passengers) vs. maximum waiting time for varying vehicle capacity (1, 2, 4, and 10 passenger) and varying fleet sizes (fleet sizes of 1,000, 2,000, and 3,000 vehicles)
Figure 6F:
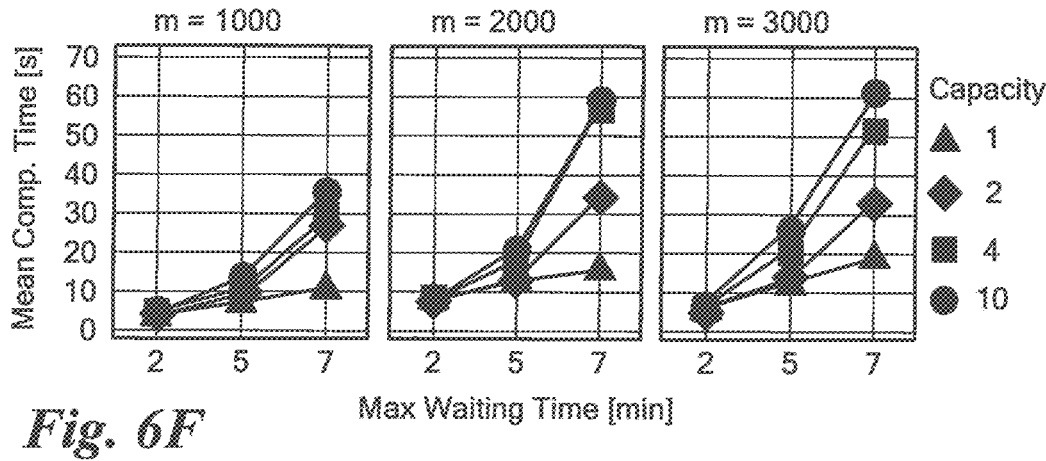
FIG. 6F is a plot of average computational time for a thirty (30) second iteration of the method described herein including computation of the RV-graph, computation of the RTV-graph, ILP assignment, rebalancing, and data writing.

FIG. 6D is a plot of average distance traveled by each vehicle during a single day vs. maximum waiting time for varying vehicle capacity (1, 2, 4, and 10 passenger) and varying fleet sizes (fleet sizes of 1,000, 2,000, and 3,000 vehicles).

FIG. 6E is a plot of percentage of shared rides (number of passengers who shared a ride divided by the total number of picked-up passengers) vs. maximum waiting time for varying vehicle capacity (1, 2, 4, and 10 passenger) and varying fleet sizes (fleet sizes of 1,000, 2,000, and 3,000 vehicles).

FIG. 6F is a plot of average computational time for a thirty (30) second iteration of the method in a 24 core 2.5 GHz machine, including computation of the RV-graph, computation of the RTV-graph, ILP assignment, rebalancing, and data writing (higher levels of parallelization would drastically reduce this computational time).

In summary, FIGS. 6A-6F illustrate an analysis of: service rate (percentage of requests serviced) (A), average in car delay δ-ω(B), average waiting time ω (C), average distance traveled by each vehicle during a single day (D), percentage of shared rides (number of passengers who shared a ride divided by the total number of picked-up passengers) (E), and average computational time for a 30-s iteration of the method (F), in a 24 core 2.5 GHz machine, including computation of the RV-graph, computation of the RTV-graph, ILP assignment, rebalancing, and data writing (higher levels of parallelization would drastically reduce this computational time).

Some parameters used in the simulations described herein are next described.

In practice, a time-out can be set both for the amount of time spent generating candidate trips for each vehicle, and for the amount of time spent exploring the branches of the ILP. Alternatively, one may set a limit on the number of vehicles considered per request, the number of candidate trips per vehicle or the optimality gap of the ILP. These trade-off optimality for tractability and depend on the available resources.

To achieve real-time performance it may be necessary to employ a set of timeouts. If allowed to progress past the selected timeout, the method would eventually find the optimal assignment.

One implemented the function travel (T; v), which computes the optimal route for given trip T and vehicle v, as follows. If the number of passengers and requests is less or equal than four, one perform an exhaustive search to compute the optimal route which satisfies the constraints. If the number of passengers is greater than four, for each additional request one only check the routes that maintain the order of the current passengers in the vehicle.

In the computation of the RV-graph one may set limits on the number of edges. In particular, one compute the complete graph and, for each request, one keep a maximum of 30 links with candidate vehicles, in particular those of lowest trip cost. Speed-ups such as the ones proposed in T-share [4] could be employed in this stage to prune the most likely vehicles to pick up a request.

In the computation of the RTV-graph one specify a maximum amount of time, per vehicle, to explore potential trips and add edges to the graph. In particular, one used a timeout of 0:2 seconds per vehicle. This leads to sub-optimality of the solution, but faster computation, removing longer trips.

It should be appreciated that the ILP can be solved with state of the art solvers. For example, a MOSEK Optimization Solver from MATLAB may be used. In an embodiment, a MOSEK solver may be used with an optimality gap of 0.1% and a maximum run time of 15 seconds. The MOSEK solver employs heuristics in the exploration of the branches of the problem. Other solvers having the same or similar capabilities, may of course, also be used.

Figure 7:
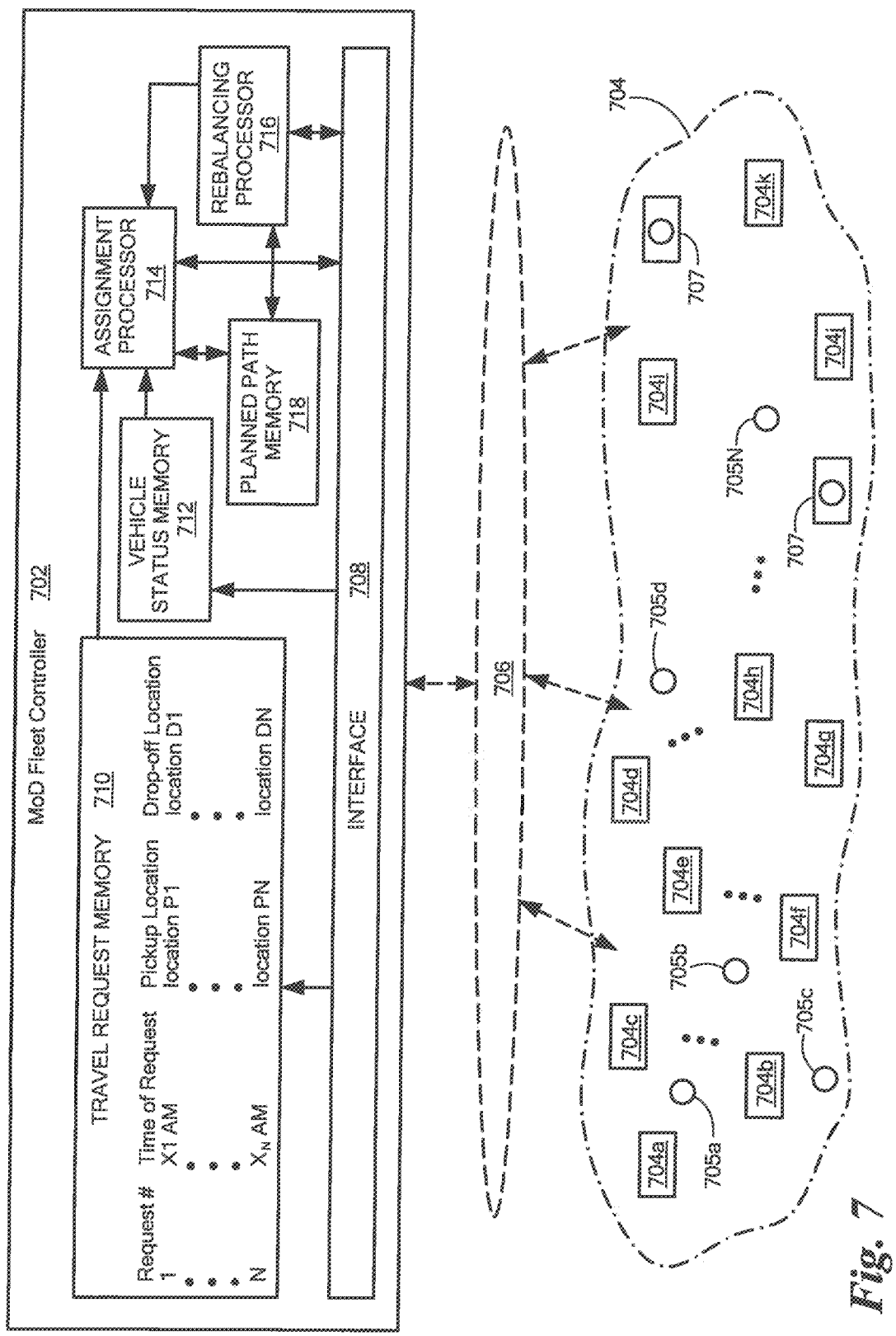
FIG. 7 is a block diagram of a ride sharing system for assigning travel requests to vehicles and finding optimal routes for a vehicle fleet.

Referring now to FIG. 7, a ride sharing system for assigning ravel requests for vehicles and finding optimal routes for one or more vehicles within a fleet of vehicles in response to one or more ride requests includes a MoD fleet controller 702 in communication with one or more vehicles 704a -704k, generally denoted 704, and one or more persons wishing to ride share 705a-705N ang generally denoted 705, through a network 706. Network 706 may, for example, be an internet or any other type of network capable of supporting communication between MoD fleet controller 702 and vehicles and ride sharing persons 704, 705.

The MoD fleet controller includes an interface 708 to the vehicles and requesters. In response to requests provided thereto through interface 708, travel requests are stored in a travel request memory. The travel request may include at least a timer request, a pickup location and a drop off location. Other information may also be part of the travel request such as the number of persons in the party requesting travel. Vehicle 705 provides vehicle status information which is stored in memory 712. The memories 710, 712 are coupled to an assignment processor 714.

In response to the travel request information and vehicle status information provided thereto, the assignment processor assigns travel requests to vehicles and/or finds optimal routes for each assigned vehicle in accordance with the techniques described hereinabove in conjunction with FIGS. 1-6F.

MoD fleet controller 702 further includes a vehicle plan memory 718 which receives information via interface 708 and which has two-way communication paths with the assignment and rebalancing processors 714, 716. Planned path memory 718 receives and stores planned path and pickup/drop-off schedules for occupied vehicles. For example, for vehicles with occupants denoted 707, information related to a planned path and drop-off/pickup schedule is stored in a memory 718. Thus, MoD fleet controller is able to track and process information related to travel requests, vehicle status and planned path and drop-off/pickup schedules. This information may be used by assignment and rebalancing processors to track vehicle paths (for example) and use such information in future request-vehicle assignments as well as in the rebalancing process.

In embodiments, MoD fleet controller 702 may also further include a rebalancing processor 716. Upon completion of one or more assignments, it is possible that more vehicles are located in a region having less requests than are needed for the number of vehicles in that location. For example, such imbalances may occur when idle vehicles are in areas far away from an area of current requests and/or due to the maximum waiting time and/or delayed constraints and/or vehicle capacity. To rebalance the vehicle fleet, upon completion of one or more assignments some vehicles are geographically repositioned to a location which allows all travel requests to be serviced while reducing and ideally minimizing travel times.

Having described preferred embodiments, which serve to illustrate various concepts, structures and techniques, which are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A system for controlling and continuously rerouting a fleet of vehicles based up on real-time requests, the system comprising:
   (a) means for receiving current requests for rides within a window;
   (b) means for generating a pairwise request-vehicle shareability graph (RV-graph), the RV-graph representing which of the current requests and vehicles within the fleet of vehicles can be pairwise-shared based at least in part on a number of passengers currently in each of the vehicles within the fleet of vehicles;
   (c) means for generating a request-trip-vehicle graph (RTV-graph) representing trips and one or more vehicles within the fleet of vehicles that can serve the trips, wherein each of the trips corresponds to a group of one or more of the current requests for rides and has a trip size corresponding to a number of the current requests for rides, wherein generating the RTV-graph includes finding feasible trips incrementally in trip size for each vehicle using the RV-graph, wherein a trip is feasible for a vehicle if all the corresponding current requests for rides can be picked up and dropped off by the vehicle while satisfying one or more constraints;
   (d) means for solving an integer linear program (ILP) to determine an assignment of vehicles to trips, the ILP formed using the RTV-graph; and
   (e) means for assigning specific vehicles from the fleet of vehicles to specific trips.

2. The system of claim 1 further comprising means for determining feasibility of trips in the RTV-graph.

3. The system of claim 1 further comprising means for rebalancing idle vehicles to areas with high demand.

4. The system of claim 1 wherein the fleet of vehicles is a fleet of autonomous vehicles.

5. The system of claim 1 wherein generating the RV-graph comprises: determining pairs of current requests that could be completed by at least one of the vehicles while satisfying one or more constraints; and determining pairs of current requests and vehicles that can serve the current requests based on the one or more constraints.

6. The system of claim 1 wherein the RV-graph includes: first nodes corresponding to the current requests for rides; second nodes corresponding to the vehicles in the fleet of vehicles; at least one edge connecting two of the first nodes; and at least one edge connecting one of the first nodes with one of the second nodes.

7. The system of claim 1 wherein generating the RTV-graph comprises identifying cliques within the RV-graph.

8. The system of claim 1 wherein the RTV-graph includes: first nodes corresponding to the current requests for rides; second nodes corresponding to the trips; third nodes corresponding to the vehicles in the fleet of vehicles; at least one edge connecting one of the first nodes to one of the second nodes; and at least one edge connecting one of the third nodes to one of the second nodes.

9. The system of claim 1 wherein determining the assignment of vehicles to trips comprises selecting a set of feasible trips from RTV-graph using the ILP.

10. The system of claim 1 wherein: the fleet of vehicles comprises one or more autonomous vehicles; and the means for assigning specific vehicles from the fleet of vehicles to specific trips comprises: a communication network; and a mobility-on-demand (MoD) fleet controller configured to communicate with the one or more autonomous vehicles over the communication network to control the one or more autonomous vehicles.

* * * * *